US010926658B2

(12) United States Patent
Sakuma et al.

(10) Patent No.: US 10,926,658 B2
(45) Date of Patent: Feb. 23, 2021

(54) COMMUNICATION SYSTEM, SERVER, AND TERMINAL

(71) Applicant: TOYOTA JIDOSHA KABUSHIKI KAISHA, Toyota (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 16/168,240

(22) Filed: Oct. 23, 2018

(65) Prior Publication Data

US 2019/0118667 A1 Apr. 25, 2019

(30) Foreign Application Priority Data

Oct. 25, 2017 (JP) .............................. JP2017-206509

(51) Int. Cl.
*B60L 53/66* (2019.01)
*G06Q 10/02* (2012.01)
(Continued)

(52) U.S. Cl.
CPC ............. *B60L 53/665* (2019.02); *B60L 53/14* (2019.02); *G06Q 10/02* (2013.01); *G06Q 20/145* (2013.01);
(Continued)

(58) Field of Classification Search
CPC .... B60L 53/665; B60L 53/14; H04L 63/0492; H04L 63/0838; G06Q 20/3224;
(Continued)

(56) References Cited

U.S. PATENT DOCUMENTS 10,272,793 B2 * 4/2019 Perry ...................... B60L 53/65
10,518,661 B2 * 12/2019 Haneda ................... B60L 58/12
(Continued)

FOREIGN PATENT DOCUMENTS

JP 2002169918 A 6/2002
JP 2002354609 A 12/2002
(Continued)

*Primary Examiner* — Nha T Nguyen
(74) *Attorney, Agent, or Firm* — Hunton Andrews Kurth LLP

(57) ABSTRACT

A provider terminal transmits, to a server, (i) location information for specifying a location of a power supply facility for supplying power to a vehicle and (ii) an acceptance period for accepting the supply of power at the location. The user terminal transmits, to the server, (i) a desired location for the supply of power to the vehicle and (ii) a desired starting time for the supply of power to the vehicle at the desired location. The server includes: a provision DB configured to store one or more pieces of association information in which respective pieces of location information are associated with respective acceptance periods; a determination device configured to determine a power supply facility corresponding to the desired location and the desired starting time; and a communicator configured to notify a location of the power supply facility.

13 Claims, 17 Drawing Sheets

(51) Int. Cl.
*H04L 29/06* (2006.01)
*G06Q 20/14* (2012.01)
*B60L 53/14* (2019.01)
*G06Q 20/32* (2012.01)
*G07F 15/00* (2006.01)
*H04W 4/02* (2018.01)
*H04W 12/06* (2021.01)

(52) U.S. Cl.
CPC ....... *G06Q 20/3224* (2013.01); *G07F 15/005* (2013.01); *H04L 63/0492* (2013.01); *H04L 63/0838* (2013.01); *H04W 4/023* (2013.01); *H04W 12/06* (2013.01)

(58) Field of Classification Search
CPC .... G06Q 10/02; G06Q 20/145; G07F 15/005; H04W 4/023; H04W 12/06; Y02T 90/12; Y02T 90/14; Y02T 10/70; Y02T 10/7072; Y02T 90/16
See application file for complete search history.

(56) References Cited

U.S. PATENT DOCUMENTS

| | | | | |
|---|---|---|---|---|
| 2011/0093314 | A1* | 4/2011 | Redmann | B60L 1/02 |
| | | | | 705/13 |
| 2011/0246252 | A1* | 10/2011 | Uesugi | B60L 3/12 |
| | | | | 705/7.12 |
| 2012/0233077 | A1* | 9/2012 | Tate, Jr. | G06Q 10/20 |
| | | | | 705/65 |
| 2014/0203779 | A1* | 7/2014 | Eger | H02J 7/0027 |
| | | | | 320/109 |
| 2014/0257884 | A1* | 9/2014 | Kyoung | G06Q 10/02 |
| | | | | 705/5 |
| 2015/0046200 | A1 | 2/2015 | Chihara | |
| 2015/0158393 | A1* | 6/2015 | Kawano | B60L 53/65 |
| | | | | 320/109 |
| 2015/0224888 | A1* | 8/2015 | Wild | B60L 11/1824 |
| | | | | 705/26.9 |
| 2015/0286965 | A1* | 10/2015 | Amano | G01C 21/3469 |
| | | | | 705/5 |
| 2015/0291145 | A1* | 10/2015 | Yu | B60W 10/06 |
| | | | | 701/22 |
| 2015/0298565 | A1* | 10/2015 | Iwamura | G01C 21/3476 |
| | | | | 701/22 |
| 2016/0273927 | A1* | 9/2016 | Kitajima | G01C 21/3415 |
| 2017/0357652 | A1* | 12/2017 | Foster | G06F 16/29 |
| 2018/0065494 | A1* | 3/2018 | Mastrandrea | G06Q 10/02 |
| 2018/0189683 | A1* | 7/2018 | Newman | G06Q 10/02 |
| 2019/0152340 | A1* | 5/2019 | Haneda | B60L 53/67 |
| 2019/0160958 | A1* | 5/2019 | Chaudhary | B60L 53/665 |

FOREIGN PATENT DOCUMENTS

| | | |
|---|---|---|
| JP | 2011107929 A | 6/2011 |
| JP | 2013-008267 A | 1/2013 |
| JP | 2014-149611 A | 8/2014 |
| JP | 6219461 B1 | 10/2017 |
| WO | 2013/137071 A1 | 9/2013 |

\* cited by examiner

FIG.6A
PROVIDER MEMBERSHIP DB

| PROVIDER ID | PROVIDER NAME | POWER SUPPLY FACILITY ID | POWER SUPPLY FACILITY LOCATION | BANK ACCOUNT | POWER SUPPLY UNIT PRICE | SEED CODE |
|---|---|---|---|---|---|---|
| V1 | A1 | K1 | W CITY 1-1-1, OSAKA (X1,Y1) | ABC BANK ... | R1 | S1 |
| V2 | A2 | K2 | X CITY 1-1-1, TOKYO (X2,X2) | : | R2 | S2 |
|  |  | K3 | Y CITY 2-3-4, TOKYO (X3,Y3) | : | R3 | S3 |
| : | : | : | : | : | : | : |

FIG.6B
USER MEMBERSHIP DB

| USER ID | USER NAME | NOTIFICATION TARGET ID | BANK ACCOUNT |
|---|---|---|---|
| U1 | B1 | S1 | DEF BANK ... |
| U2 | B2 | S2 | : |
| : | : | : | : |

FIG.6C
PROVISION DB

| PROVIDER ID | PROVIDER NAME | POWER SUPPLY FACILITY ID | POWER SUPPLY FACILITY LOCATION | POWER SUPPLY ACCEPTANCE PERIOD | RESERVATION STATUS | POWER SUPPLY UNIT PRICE | SEED CODE |
|---|---|---|---|---|---|---|---|
| O53 | A53 | K53 | X CITY 1-1-1, OSAKA (X53,Y53) | 7:00 TO 24:00 ON MARCH 19 | 12:00 ON MARCH 19 (USER ID U21) | R53 | S53 |
| O62 | A62 | K62 | W CITY 2-1-1, KANAGAWA (X62,Y62) | 15:00 ON MARCH 20 TO 10:00 ON MARCH 24 | NONE | R62 | S62 |
| : | : | : | : | : | : | : | : |

FIG.6D
USE DB

| USER ID | USER NAME | DESIRED POWER SUPPLY LOCATION | DESIRED POWER SUPPLY STARTING TIME | NOTIFICATION TARGET ID |
|---|---|---|---|---|
| U21 | B21 | X CITY, OSAKA | 12:00 ON MARCH 19 | S21 |
| U24 | B24 | β CITY, TOKYO | 13:00 ON MARCH 20 | S24 |
| : | : | : | : | : |

COMMUNICATION SYSTEM, SERVER, AND TERMINAL

This nonprovisional application is based on Japanese Patent Application No. 2017-206509 filed on Oct. 25, 2017, with the Japan Patent Office, the entire contents of which are hereby incorporated by reference.

BACKGROUND

Field

The present disclosure relates to a communication system, a server, and a terminal.

Description of the Background Art

Conventionally, a system has been known in which a power supply facility for supplying power to an electric vehicle can be rented to another person and the other person can make a reservation to use the power supply facility and then can use the power supply facility. For example, Japanese Patent Laying-Open No. 2014-149611 discloses a technique for notifying a power supply facility around a vehicle driven by a user in response to the user performing an inquiry operation onto the vehicle.

SUMMARY

However, in the system above, the user cannot designate desired location and time, with the result that convenience for the user cannot be improved.

It is an object of the present disclosure to provide a communication system, a server, and a terminal, by each of which convenience for a user is improved.

A communication system according to a certain aspect of the present disclosure is a communication system including: a server; a first terminal configured to communicate with the server; and a second terminal configured to communicate with the server. The first terminal includes a first transmitter configured to transmit, to the server, (i) location information for specifying a location of a power supply facility for supplying power to a vehicle and (ii) an acceptance period for accepting the supply of power at the location. The second terminal includes a second transmitter configured to transmit, to the server, information including (i) a desired location for the supply of power to the vehicle and (ii) a desired starting time for the supply of power to the vehicle at the desired location. The server includes: a storage configured to store one or more pieces of association information in which respective pieces of location information are associated with respective acceptance periods; a determination device configured to determine a power supply facility corresponding to the desired location and the desired starting time based on the one or more pieces of stored association information; and a notification device configured to notify a location of the power supply facility determined by the determination device.

Accordingly, a provider of the power supply facility can provide the power supply facility during a period corresponding to the acceptance period, and a user of the power supply facility can use the power supply facility to supply power to the vehicle at the location corresponding to the desired location and the time corresponding to the desired starting time.

In a certain embodiment, the server further includes a third transmitter configured to transmit, to an in-vehicle device that receives the notification from the notification device, information for permitting the supply of power at the power supply facility notified by the notification device.

Accordingly, power is permitted to be supplied to the vehicle including the in-vehicle device for which the supply of power is permitted. Hence, a vehicle not permitted to be supplied with power cannot be supplied with power, thereby preventing power from being supplied wrongfully.

In a certain embodiment, when the desired starting time is not included in the acceptance period and a difference between a starting time of the acceptance period and the desired starting time is less than a predetermined value, the server is configured to transmit, to the first terminal, first facilitation information for facilitating a change of the acceptance period.

Accordingly, an opportunity for the provider to provide the power supply facility and an opportunity for the user to use the power supply facility can be increased.

In a certain embodiment, when the desired starting time is not included in the acceptance period and a difference between a starting time of the acceptance period and the desired starting time is less than a predetermined value, the server is configured to transmit, to the second terminal, second facilitation information for facilitating a change of the desired starting time.

Accordingly, an opportunity for the provider to provide the power supply facility and an opportunity for the user to use the power supply facility can be increased.

In a certain embodiment, as the association information, the storage is configured to store the location information, the acceptance period, and a power supply fee in association with one another. When the notification device notifies locations of a plurality of power supply facilities, the server is configured to transmit, to the first terminal corresponding to an expensive power supply fee of respective power supply fees of the plurality of power supply facilities, third facilitation information for facilitating reduction of the power supply fee.

Accordingly, an opportunity for the provider to provide the power supply facility can be increased and the user can use the power supply facility inexpensively.

In a certain embodiment, as the location of the power supply facility, the notification device is configured to notify a part of an address of the location, rather than a whole of the address of the location.

Accordingly, security can be improved as compared with a case where the whole of the address of the location is notified as the location of the power supply facility.

In a certain embodiment, on a condition that the server receives user identification information of a user who desires to supply power to the vehicle, the notification device is configured to notify, to a terminal of the user, the power supply facility determined by the determination device. The server further includes a request controller configured to perform a process for requesting, to the user for whom the supply of power to the vehicle has been ended and who corresponds to the user identification information, a fee corresponding to an amount of the supply of power.

Accordingly, the fee corresponding to the amount of supply of power can be requested appropriately to the user of the power supply facility who has supplied power to the vehicle.

In a certain embodiment, in addition to the location information and the acceptance period, the storage is configured to store provider identification information for identifying a provider of the power supply facility. The server further includes a payment controller configured to perform a process for paying, to the provider having provided the power supply facility and corresponding to the provider identification information, a fee corresponding to an amount of the supply of power, when the supply of power to the vehicle at the power supply facility is ended.

Accordingly, the fee corresponding to the amount of supply of power can be paid appropriately to the provider of the power supply device for the supply of power to the vehicle.

A server according to another aspect of the present disclosure includes: a first receiver configured to receive (i) location information for specifying a location of a power supply facility for supplying power to a vehicle, and (ii) an acceptance period for accepting the supply of power at the location; a second receiver configured to receive (i) a desired location for the supply of power to the vehicle and (ii) a desired starting time for the supply of power to the vehicle at the desired location; a storage configured to store one or more pieces of association information in which respective pieces of location information are associated with respective acceptance periods; a determination device configured to determine a power supply facility corresponding to the desired location and the desired starting time based on the one or more pieces of stored association information; and a notification device configured to notify a location of the power supply facility determined by the determination device.

Accordingly, a provider of the power supply facility can provide the power supply facility during the period corresponding to the acceptance period, and a user of the power supply facility can use the power supply facility at the location corresponding to the desired location and the time corresponding to the desired starting time.

A terminal according to another aspect of the present disclosure is a terminal configured to communicate with a server configured to store one or more pieces of association information in which respective pieces of location information for specifying locations of power supply facilities each for supplying power to a vehicle are associated with respective acceptance periods for accepting the supply of power at the locations. The terminal includes: a transmitter configured to transmit, to the server, information including (i) a desired location for the supply of power to the vehicle and (ii) a desired starting time for the supply of power to the vehicle at the desired location; and a receiver configured to receive information of a location of a power supply facility determined based on the one or more pieces of stored association information, the power supply facility corresponding to the desired location and the desired starting time.

Accordingly, a provider of the power supply facility can provide the power supply facility during the period corresponding to the acceptance period, and a user of the power supply facility can use the power supply facility at the location corresponding to the desired location and the time corresponding to the desired starting time.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6A to FIG. 6D show various types of DBs.

DESCRIPTION OF THE PREFERRED EMBODIMENTS

Figure 1:
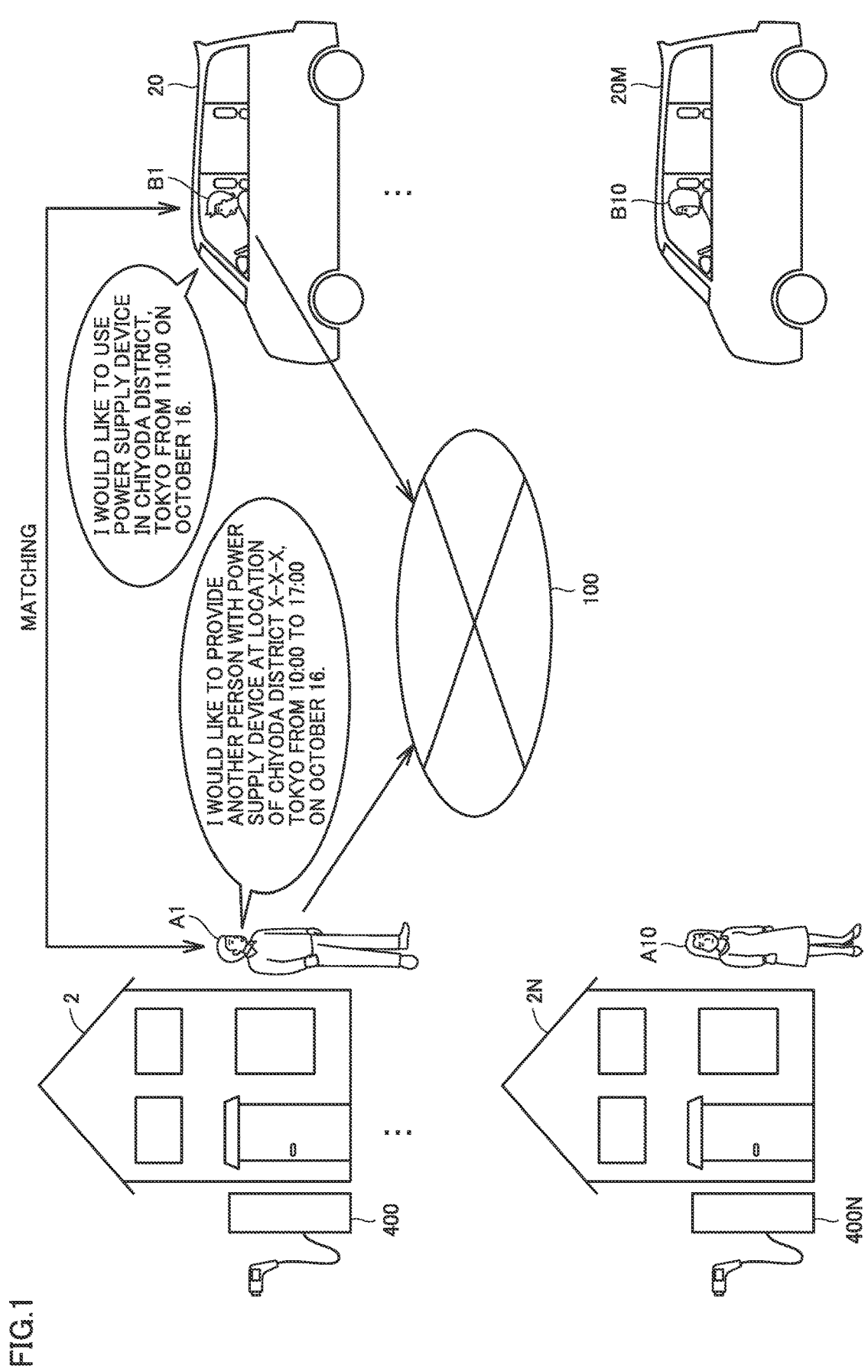
FIG. 1 shows an exemplary situation to which the present embodiment is applied.

The following describes embodiments of the present disclosure with reference to figures in detail. It should be noted that the same or corresponding portions are given the same reference characters and are not described repeatedly.

<Application>

FIG. 1 shows an exemplary situation to which the present embodiment is applied. With reference to FIG. 1, the following describes an exemplary situation to which the present embodiment is applied. In the example of FIG. 1, a provider A1, a provider A10, a user B1, and a user B10 are illustrated. In the present embodiment, the term "provider" refers to a person who provides another person with "a power supply device or a power supply facility including the power supply device" (hereinafter, also simply referred to as "power supply device"). Moreover, the term "user" refers to a person who uses the power supply device provided by the provider. The expression "use the power supply device" means that the user supplies power to the vehicle using the power supply device, for example.

The vehicle includes: an electric motor configured to generate driving power for traveling of the vehicle; and a battery configured to store electric power to be supplied to the electric motor. The battery is configured to be supplied with power using the power supply device. The vehicle herein is a plug-in hybrid vehicle or an electric vehicle, for example. Moreover, the vehicle includes an in-vehicle device described later.

The provider may desire to provide the power supply device of the provider to another person while the power supply device of the provider is not used. On the other hand, the user may desire to use a power supply device in a region where the user travels by his/her vehicle, for example. In such a case, the provider can provide the power supply device to the user and the user can use the power supply device if the location of the power supply device which the provider desires to provide and an acceptance period of the power supply device correspond to the location at which the user desires to use a power supply device and a starting time (hereinafter, also referred to as "use starting time") at which the power supply device is started to be used at this location. Therefore, while the provider does not use the power supply device, the provider can provide the power supply device to the user. The term "acceptance period" refers to a period during which the provider desires to provide another person with the power supply facility owned by the provider. Moreover, the term "location" includes the longitude and latitude of this location, for example.

In the example of FIG. 1, it is illustrated that provider A1 desires to "provide another person with the power supply device at the location of Chiyoda District X-X-X, Tokyo from 10:00 to 17:00 on October 16". On the other hand, user B1 desires to "use a power supply device in Chiyoda District, Tokyo from 11:00 on October 16". Hence, by matching the location and period at and during which provider A1 desires to provide the power supply device to the location and starting time at which user B1 desires to use a power supply device, it is possible to specify that "user B1 can use the power supply device of provider A1 in Chiyoda District X-X-X, Tokyo from 11:00 on October 16".

Thus, in the present embodiment, the user is allowed to use the power supply device at the location and period corresponding to the location and period at and during which provider A1 desires to provide the power supply device.

<Exemplary Configuration of Communication System>

Figure 2:
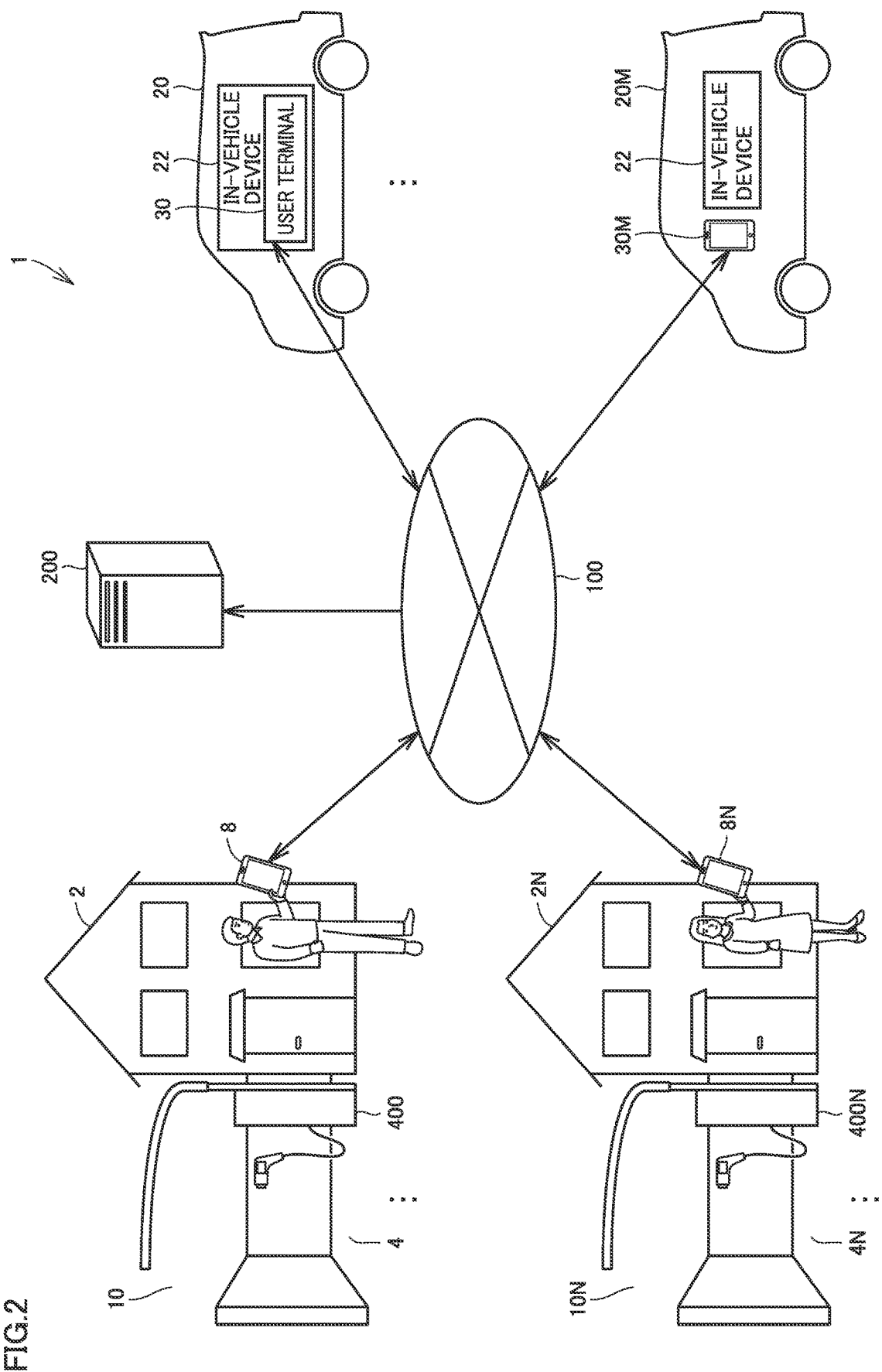
FIG. 2 is an entire configuration diagram of a communication system according to the present embodiment.

FIG. 2 is an entire configuration diagram of a communication system 1 according to the present embodiment. As shown in FIG. 2, communication system 1 according to the present embodiment includes: a server 200; N provider terminals 8, . . . , 8N (N is an integer equal to or more than 1); M user terminals 30, . . . , 30M (M is an integer equal to or more than 1); and a network 100. In the description below, provider terminals 8, . . . , 8N will be collectively referred to as "provider terminal 8". User terminals 30, . . . , 30M will be also collectively referred to as "user terminal 30".

Provider terminal 8 is a terminal owned by a provider. Provider terminal 8 is a terminal configured to receive various types of information from the provider and present various types of information. User terminal 30 is a terminal owned by a user. User terminal 30 is a terminal configured to receive various types of information from the user and present various types of information. Provider terminal 8 and server 200 are configured to communicate with each other via network 100. Moreover, user terminal 30 and server 200 are configured to communicate with each other via network 100. Network 100 is constructed of a WAN (Wide Area Network) or a LAN (Local Area Network). At least one of N provider terminals 8, . . . , 8N (N is an integer equal to or more than 1) may be one of a smartphone, a tablet, a PC (personal computer), and the like. Moreover, at least one of M user terminals 30, . . . , 30M (M is an integer equal to or more than 1) may be one of a smartphone, a tablet, a PC (personal computer), and the like, or may be included in an in-vehicle device 22. Moreover, provider terminal 8 is also referred to as "first terminal", and user terminal 30 is also referred to as "second terminal".

In the example of FIG. 1, each provider owns: provider terminal 8; and power supply facility 10 provided in the site of a house 2. Power supply facility 10 includes: a parking space 4 in which a vehicle to be supplied with power is to be parked; and a power supply device 400 configured to supply power to the vehicle, for example. On the other hand, each user owns user terminal 30. Further, in-vehicle device 22 may include user terminal 30. In addition, in-vehicle device 22 includes: a navigation device having GPS (Global Positioning System); and the like. Moreover, in-vehicle device 22 is mounted on vehicle 20.

<Hardware Configuration>

Figure 3:
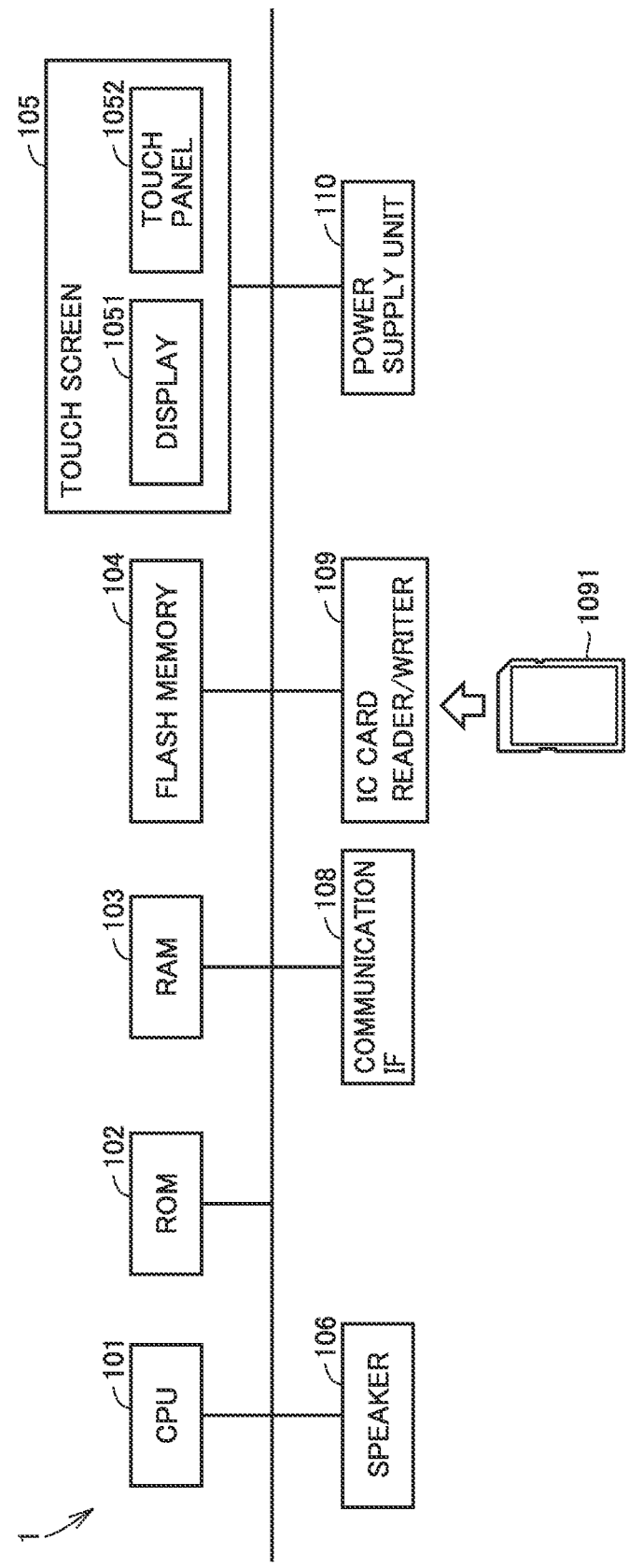
FIG. 3 shows hardware such as a provider terminal.

FIG. 3 shows an exemplary hardware configuration of each of provider terminal 8, user terminal 30, and in-vehicle device 22 including user terminal 30 (hereinafter, also referred to as "provider terminal 8 etc.,").

With reference to FIG. 3, provider terminal 8 etc., includes: a CPU (Central Processing Unit) 101 configured to execute a program; a ROM (Read Only Memory) 102 configured to store data in a non-volatile manner; a RAM (Random Access Memory) 103 configured to store data in a volatile manner; a flash memory 104; a touch screen 105; a speaker 106; a communication IF (Interface) 108; an IC (Integrated Circuit) card reader/writer 109; and a power supply unit 110.

Touch screen 105 includes: a display 1051 serving as a display device; and a touch panel 1052 serving as an input device. Specifically, touch screen 105 is implemented by positioning and fixing touch panel 1052 on display 1051 (for example, a liquid crystal display). It should be noted that in touch screen 105, as a method for detecting a touch position, a resistive method or a capacitive method can be used, for example.

Flash memory 104 is a non-volatile semiconductor memory. Flash memory 104 stores: an operating system and various programs executed by CPU 101; various contents; and data.

Speaker 106 generates a sound in accordance with an instruction from CPU 101. Communication IF 108 is an interface used to communicate with another device. Communication IF 108 is configured to perform a process for transmitting data in a wireless manner and/or wired manner.

Touch panel 1052 is an input device configured to receive an input (touch input) by the user's finger, a stylus pen, or the like. CPU 101 specifies an input position based on an output from touch panel 1052, and performs a process based on the specified input position. Components 101 to 110 are connected to one another via a data bus. A memory card 1091 is attached to IC card reader/writer 109.

The process in provider terminal 8 etc., is implemented by each hardware and software executed by CPU 101. Such software may be stored in flash memory 104 in advance. Alternatively, the software may be stored in memory card 1091 or another storage medium and may be distributed as a program product. Alternatively, the software may be provided, as a downloadable program product, by a so-called information service provider connected to the Internet. Such software is temporarily stored in flash memory 104 after reading the software from the storage medium using IC card reader/writer 109 or another reader or after downloading the software via the communication IF. The software is read from flash memory 104 by CPU 101 and is stored in flash memory 104 in the form of an executable program. CPU 101 executes the program.

Each component included in provider terminal 8 etc., in the figure is a general component. Therefore, it can be said that the essential part of the present embodiment is the software stored in flash memory 104, memory card 1091 or other storage media, or is the software downloadable via the network. It should be noted that the operation of each hardware such as provider terminal 8 is well known, and therefore is not repeatedly described in detail.

It should be noted that the storage medium is not limited to a DVD-ROM, a CD-ROM, a FD (Flexible Disk), and a hard disk, and may be a medium that fixedly carries a program, such as: a magnetic tape; a cassette tape; an optical disc (MO (Magnetic Optical Disc)/MD (Mini Disc)/DVD (Digital Versatile Disc)); an optical card; and a semiconductor memory such as a mask ROM, an EPROM (Electronically Programmable Read-Only Memory), an EEPROM (Electronically Erasable Programmable Read-Only Memory), or a flash ROM. Moreover, the storage medium is a non-transitory medium from which a computer can read the program or the like.

The program herein includes not only a program that can be directly executed by a CPU, but also a program in the form of a source program, a compressed program, an encrypted program, and the like.

Moreover, server 200 may be configured not to include speaker 106, touch screen 105, and the like.

<As to Each Process>

The process of communication system 1 of the present embodiment includes a "reservation process", a "power supply process", and a "payment process". The reservation process includes a process for establishing, by a user, a reservation for a power supply facility of a provider. The power supply process includes a process for supplying power to a vehicle of the user for which the reservation has been established through the reservation process. The payment process includes: a process for paying, to the provider, a fee corresponding to an amount of power supplied in the power supply facility provided by the provider; and a process for requesting, to the user, the fee corresponding to the amount of power supplied in the power supply facility used by the user.

Figure 4:
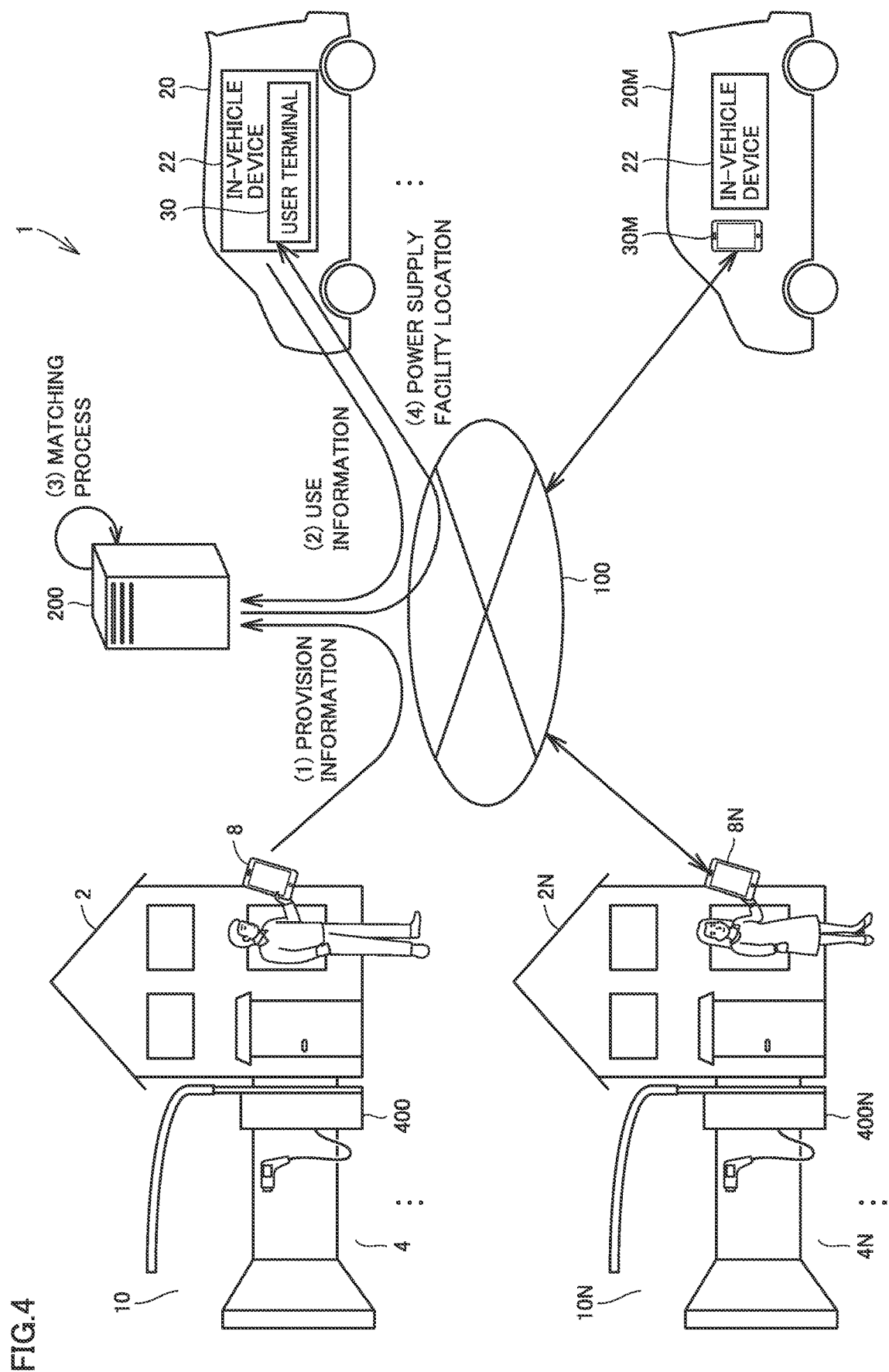
FIG. 4 shows a flow of information in a reservation process in the communication system.

It is assumed that the provider and user who use communication system 1 has made a below-described membership registration in advance. FIG. 4 shows a flow of information in the reservation process in communication system 1. As shown in FIG. 4, first, in a step of (1), the provider uses provider terminal 8 to transmit provision information to server 200 via network 100. Here, the provision information includes: location information indicating the location of the power supply facility for supplying power to the vehicle; and an acceptance period for accepting the supply of power at this location. As the provision information, server 200 stores, in a below-described provision DB, the location information and the acceptance period in association with each other.

Next, in a step of (2), the user uses user terminal 30 to transmit use information to server 200 via network 100. The use information includes: user identification information for specifying the user; a desired location for the user to supply power to the vehicle; and a desired starting time for the user to start supplying power to the vehicle. As the use information, server 200 stores, in a below-described use DB, the desired location and the acceptance period in association with each other.

Next, in a step of (3), server 200 performs a matching process based on each provision information in the provision DB and the use information in the use DB.

Next, in a step of (4), server 200 notifies, to user terminal 30, the location of a power supply facility determined as satisfying a condition based on the use information through the matching process. User terminal 30 notifies a notification result, i.e., the location(s) of one or more power supply facilities. The user makes a selection from the location(s) of the notified one or more power supply facilities. The selection result is transmitted to server 200, and the corresponding power supply facility is reserved based on the selection result.

Figure 5:
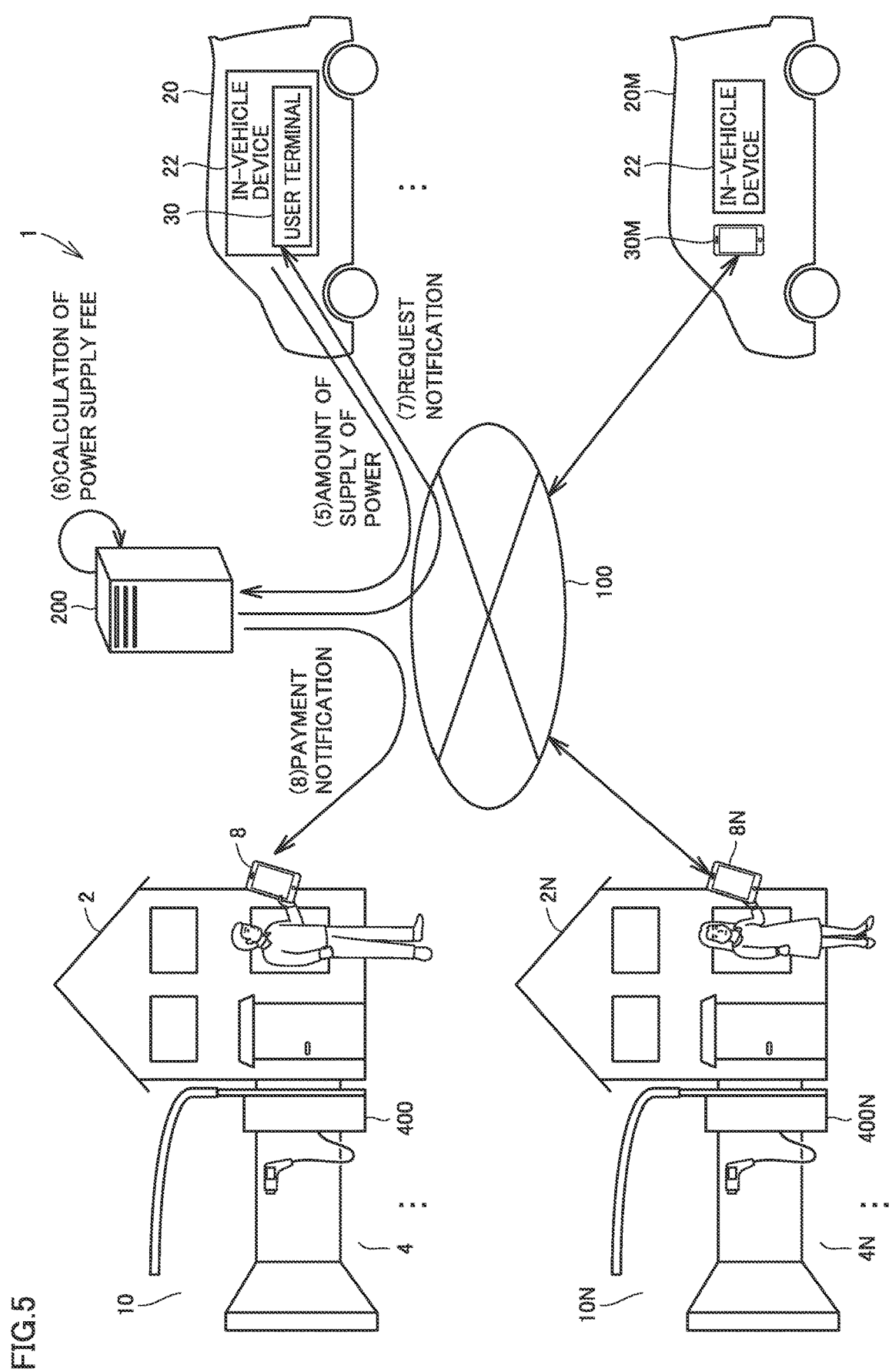
FIG. 5 shows a flow of information in a payment process in the communication system.

Next, the following describes a flow of information in the payment process. FIG. 5 shows a flow of information in the payment process in communication system 1. In a step of (5), user terminal 30 transmits, to server 200, an amount of supply of power (kWh) in the power supply process performed before the payment process. Next, in a step of (6), server 200 calculates a power supply fee corresponding to the transmitted amount of supply of power. Next, in a step of (7), server 200 transmits, to user terminal 30, request notification for requesting a fee corresponding to the power supply fee. User terminal 30 presents the request notification and the requested fee. Accordingly, the user of user terminal 30 can recognize the requested fee. Moreover, in a step of (8), server 200 transmits, to provider terminal 8, payment notification for payment of the fee corresponding to the power supply fee. Provider terminal 8 presents the payment notification and the fee paid to the provider of provider terminal 8. Accordingly, the provider of provider terminal 8 can recognize the paid fee.

<Membership Registration for Provider and User>

Next, the following describes the membership registration for the provider and the user. By making the membership registration, the provider and the user can use communication system 1 of the present embodiment. For example, each of the provider and the user can make the membership registration by way of a web page of a management company that manages server 200 and communication system 1 or by way of an application provided by the management company.

For example, the management company causes provider terminal 8 of the provider who newly applied for the membership registration to present a membership registration screen for providers. The provider inputs, into the membership registration screen, the name of the provider, the location of the power supply facility provided by the provider, a bank account of the provider, a power supply unit price, and the like. It should be noted that the membership registration screen may be a screen for allowing the provider to input other items. The items input from the membership registration screen are transmitted to server 200 via network 100. The power supply unit price is a price based on an amount of power as one unit. Typically, the power supply unit price is a price of power based on one kilowatt-hour (kWh). Thus, in the present embodiment, the provider can freely set the power supply unit price.

FIG. 6A to FIG. 6D shows various types of DBs (Date Bases). FIG. 6A shows an exemplary provider membership DB (Date Base). In the example of FIG. 6A, the provider membership DB is constructed by accumulating and storing pieces of information input from the membership registration screen. Moreover, in the provider membership DB, the providers and the power supply facilities provided by the providers were associated with respective pieces of identification information. In the example of each of FIG. 6A to FIG. 6D, the identification information is an ID (Identification).

In the example of FIG. 6A, "V1" serving as a provider ID is associated with a provider (hereinafter, referred to as "provider A1") whose name is "A1". Typically, the provider ID is information by which the provider terminal can be identified, such as an e-mail address. The location of the power supply facility provided by this provider is "W City 1-1-1, Osaka". (X1, Y1) represents the longitude and latitude of the location of this power supply facility. The power supply facility location may be the location of the power supply facility, the address of the house of the provider in proximity of the power supply facility, or the location of the power supply device, for example. The power supply facility provided by the provider is associated with K1 serving as a power supply facility ID. As the bank account of provider A1, an "account number 1234567 of the ABC bank" is associated. Moreover, provider A1 is associated with a power supply unit price R1 (JPY) and a seed code S1. The power supply unit price is a unit price input from the membership registration screen by provider A1. The seed code is used in the below-described power supply process and is a code assigned by server 200.

In the example of FIG. 6A, "V2" serving as a provider ID is associated with a provider (hereinafter, referred to as "provider A2") whose name is "A2". A plurality of power supply facilities (two in the examples of FIG. 6A to FIG. 6D) are provided by this provider. The address of the first power supply facility is "X City 1-1-1, Tokyo". (X2, Y2) represents the longitude and latitude of this power supply facility. The power supply facility provided by the provider is associated with K2 serving as a power supply facility ID. The address of the second power supply facility is "Y City 2-3-4, Tokyo". (X3, Y3) represents the longitude and latitude of this power supply facility. This power supply facility is associated with K3 serving as a power supply facility ID. Although a bank account of provider A2 is not illustrated particularly, the bank account of provider A2 is stored in association with provider A2. Moreover, the power supply facility having the power supply facility ID of K2 is associated with a power supply unit price R2 and a seed code S2, and the power supply facility having the power supply facility ID of K3 is associated with a power supply unit price R3 and a seed code S3.

Next, the membership registration for users will be described. For example, the management company causes user terminal 30 of each user who newly applied for the membership registration to present the membership registration screen for users. The user inputs the name of the user, a bank account of the user, and the like into the membership registration screen. It should be noted that the membership registration screen may be a screen for allowing the user to input other items. The items input from the membership registration screen are transmitted to server 200 via network 100.

FIG. 6B shows an exemplary user membership DB. In the example of FIG. 6B, the user membership DB is constructed by accumulating and storing pieces of information input from the membership registration screen. Moreover, in the user member DB, respective pieces of identification information (ID) are associated with the users. Each user ID is the same as the vehicle ID provided in a vehicle owned by a corresponding user, or is the same as the ID of the in-vehicle device mounted on the vehicle.

In the example of FIG. 6B, "U1" serving as a user ID is associated with a user (hereinafter, referred to as "user B1") whose name is "B1". Moreover, in the user membership DB, a notification target ID is associated with the user. The notification target ID is information for identifying a terminal (receiving device) serving as a notification target. The user can select a notification target to which the power supply facility location (see (4) and the like in FIG. 4) transmitted from server 200 is notified. For the notification target, the user can select a user terminal included in the in-vehicle device (for example, a car navigation device) or can select a device (for example, a PC, a smartphone, or a tablet) not included in the in-vehicle device, when inputting to the membership registration screen. Typically, the notification target ID is the address of the device serving as the notification target. User B1 is associated with S1 serving as the notification target ID.

Further, in the example of FIG. 6B, "U2" serving as a user ID is associated with a user (hereinafter, referred to as "user B2") whose name is "B2". Further, user B2 is associated with S2 serving as a notification target ID.

When the membership registration is ended for the provider, server 200 transmits, to the provider terminal of the provider, the provider ID given to the provider and a password corresponding to the provider ID. The provider who finished the membership registration uses the provider ID and the password to log in to server 200. It should be noted that in the example of FIG. 6A, although the passwords of the providers are not described, the passwords are actually associated with the respective providers.

Moreover, when the membership registration is ended for the user, server 200 transmits, to the user terminal of the user, the user ID given to the user and a password corresponding to the user ID. The user who finished the membership registration can use the user ID and the password to log in to server 200. It should be noted that in the example of FIG. 6B, although the passwords of the users are not described, the passwords are actually associated with the respective users.

In the examples of FIG. 6A to FIG. 6D and the like, each of the names of the providers is expressed by "A" and a reference character added to the A; however, the name of the provider is actually defined. Likewise, in the examples of FIG. 6A to FIG. 6D and the like, each of the names of the users is expressed by "B" and a reference character added to the B; however, the name of the user is actually defined.

<Exemplary Functional Configurations of Server 200 and the Like>

Figure 7:
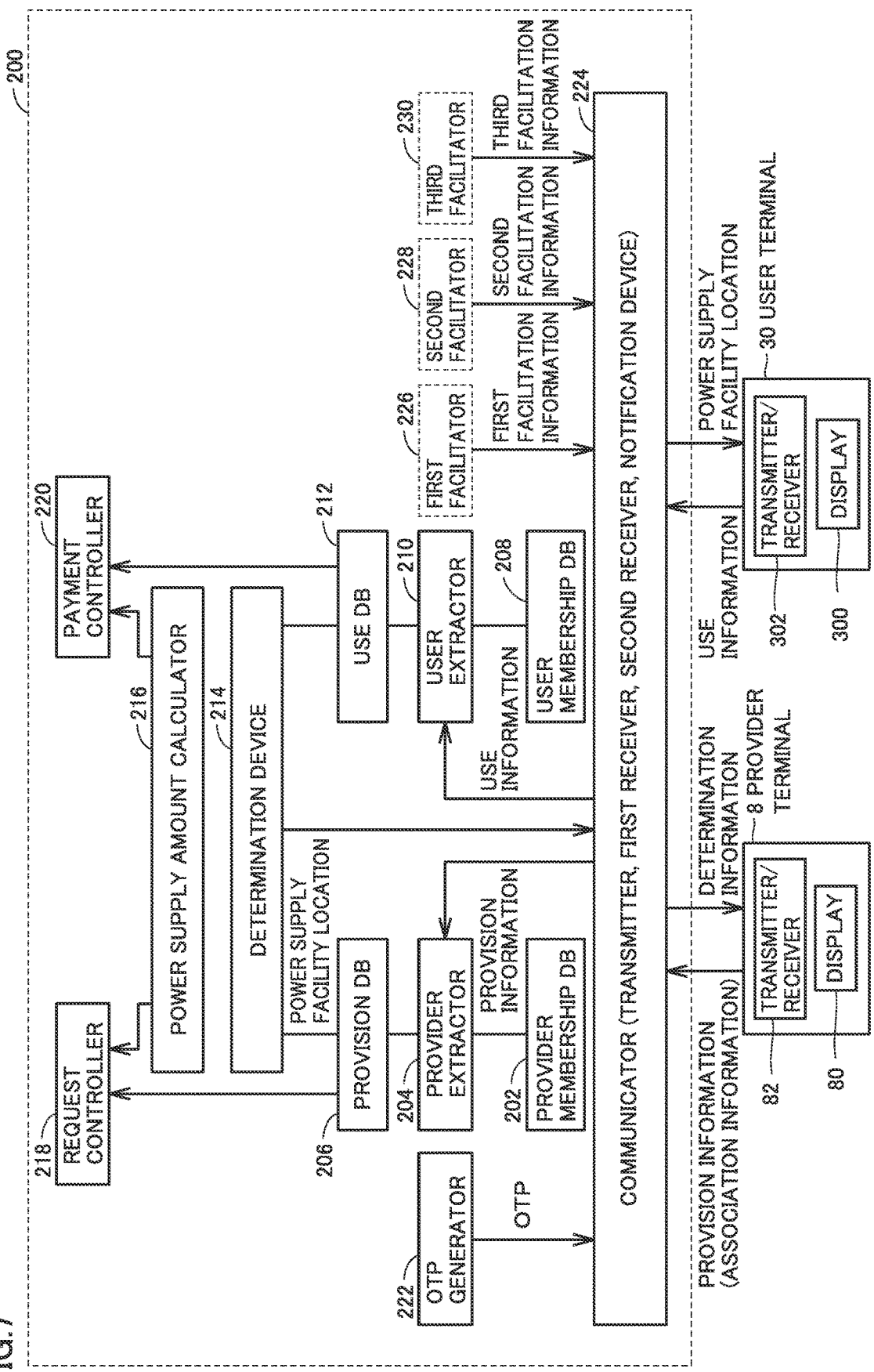
FIG. 7 shows an exemplary functional configuration such as a server.

FIG. 7 shows an exemplary functional configurations of server 200 and the like. With reference to FIG. 7, the following describes exemplary functional configurations of server 200 and the like. As shown in FIG. 7, the functions of server 200 include functions of a provider membership DB 202, a provider extractor 204, a provision DB 206, a user membership DB 208, a user extractor 210, a use DB 212, a determination device 214, a power supply amount calculator 216, a request controller 218, a payment controller 220, and an OTP generator 222. Moreover, provider membership DB 202 corresponds to the DB shown in FIG. 6A, and user membership DB 208 corresponds to the DB shown in FIG. 6B. In the description below, explanations will be individually made with regard to the reservation process, the power supply process, and the payment process.

Meanwhile, provider terminal 8 includes: a transmitter/receiver 82 configured to transmit various types of information and receive various types of information; and a display 80 configured to present various types of information. User terminal 30 includes: a transmitter/receiver 302 configured to transmit various types of information and receive various types of information; and a display 300 configured to present various types of information.

<Reservation Process>

The reservation process is performed between the provider having made the membership registration and the user having made the membership registration. The provider first inputs the password and the provider ID to provider terminal 8 so as to log in to server 200. Then, the provider makes a reservation to provide power supply facility 10 of the provider to another person (user). The provider inputs the provision information to provider terminal 8. The provision information includes: the provider ID of the provider; the location information for allowing server 200 to specify the location of the power supply facility for supplying power to the vehicle; and the acceptance period for accepting the supply of power at this location.

Here, the location information may be any information as long as server 200 can specify the location of the power supply facility in accordance with the information. For example, the location information may be the provider ID of the provider or the provider terminal. In this case, the location of power supply facility 10 of the provider corresponding to the provider ID serves as information indicating the location of power supply facility 10. It should be noted that the provider ID is transmitted from provider terminal 8 to server 200 when logged in.

Moreover, as a modification, the location information may be the location (for example, the address) of power supply facility 10 of the provider. In this case, the provider inputs the address in the login state to server 200.

The acceptance period refers to a period from (i) an acceptance starting time indicating a time at which supply of power is started to be accepted at power supply facility 10 to (ii) an acceptance ending time indicating a time at which the supply of power is ended to be accepted at power supply facility 10.

Figure 8:
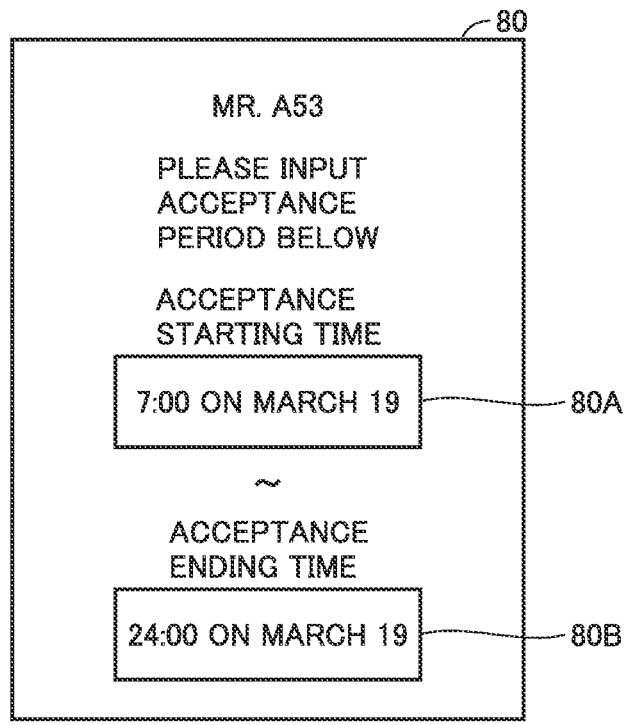
FIG. 8 shows an exemplary provision reservation screen.

FIG. 8 shows an exemplary provision reservation screen. The provision reservation screen is a screen for allowing the provider to make a reservation to provide the power supply facility. This provision reservation screen is presented on display 80 (corresponding to the touch screen of FIG. 3) of provider terminal 8. In this provision reservation screen, there are presented: the name of the provider; information for urging input of the acceptance period; an acceptance starting time space 80A; and an acceptance ending time space 80B.

In the example of FIG. 8, the name of the provider is "A53", and the information for urging input of the acceptance period is a text such as "PLEASE INPUT ACCEPTANCE PERIOD BELOW". The provider inputs, to acceptance starting time space 80A, an acceptance starting time desired by the provider. In the example of FIG. 8, as the acceptance starting time, "7:00 on March 19" is input in acceptance starting time space 80A. Moreover, the provider inputs, to acceptance ending time space 80B, an acceptance ending time desired by the provider. In the example of FIG. 8, as the acceptance ending time, "24:00 on March 19" is input in acceptance ending time space 80B. That is, in the example of FIG. 8, as the acceptance period, provider A53 inputs 7:00 on March 19 to 24:00 on March 19.

Thus, in the login state to server 200, the provider inputs the acceptance period to the provision reservation screen.

When the provision information (for example, the acceptance period) is input to provider terminal 8, transmitter/receiver 82 (transmitter) of provider terminal 8 transmits the provision information to server 200. It should be noted that when provider terminal 8 logs in to server 200, the provider ID (location information) of the provision information is transmitted, and when the acceptance period is input, the acceptance period of the provision information is transmitted. For the sake of convenience, FIG. 7 shows that the "provision information" is transmitted from provider terminal 8 to server 200.

Next, a use reservation by the user will be described. First, the user inputs the password and the user ID to user terminal 30 so as to log in to server 200. Then, the user makes a reservation to use a power supply facility 10 of a provider. The user inputs use information to user terminal 30. The use information includes: the user ID of the user; the desired location for supply of power to the vehicle; and the desired starting time for the supply of power to the vehicle.

Here, this desired location may be a non-finely specified concept (such as a region or area) or a finely specified concept (such as an address). The desired starting time is a starting time desired to start the supply of power at the desired location.

Figure 9:
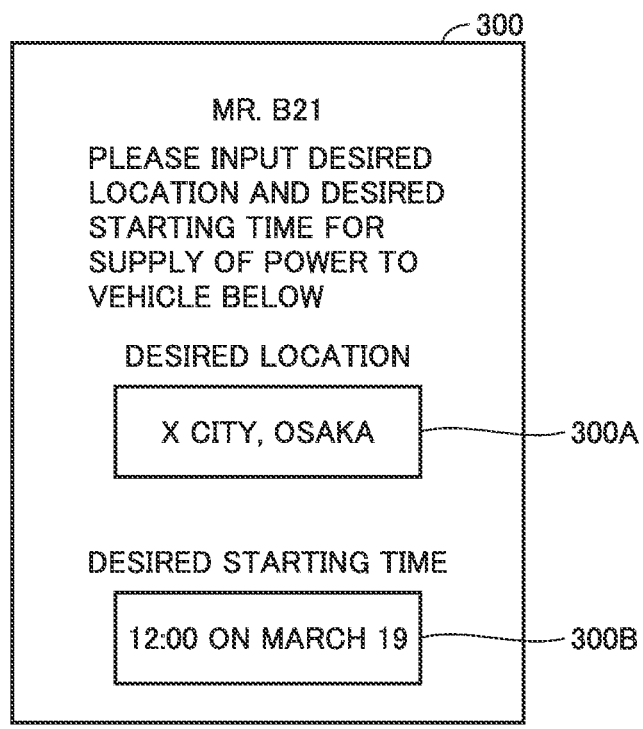
FIG. 9 shows an exemplary use reservation screen.

FIG. 9 shows an exemplary use reservation screen. The use reservation screen is a screen for allowing a user to make a reservation to use a power supply facility. This use reservation screen is presented on display 300 (corresponding to the touch screen of FIG. 3) of user terminal 30. In this use reservation screen, there are presented: the name of the user; information for urging input of the use information; a desired location space 300A; and a desired starting time space 300B.

In the example of FIG. 9, the name of the user is "B21", and the information for urging input of the use information is a text such as "PLEASE INPUT DESIRED LOCATION AND DESIRED STARTING TIME FOR SUPPLY OF POWER TO VEHICLE BELOW". The user inputs the location desired by the user for the supply of power into desired location space 300A. In the example of FIG. 9, as the desired location, "X City, Osaka" is input in desired location space 300A. Moreover, the user inputs the desired starting time to desired starting time space 300B. In the example of FIG. 9, as the desired starting time, "12:00 on March 19" is input in desired starting time space 300B. That is, in the example of FIG. 9, user B51 desires supply of power to the vehicle in "X City, Osaka" from "12:00 on March 19".

Thus, in the login state to server 200, the user inputs the desired location and the desired starting time into the use reservation screen. It should be noted that the desired location may be input by presenting a map on display 300 and allowing the user to touch a location (place) desired for supply of power on the map so as to input the desired location. When the use information is input to user terminal 30, transmitter/receiver 302 (transmitter) of user terminal 30 transmits the use information to server 200.

The login state of provider terminal 8 to server 200 may be maintained until the provider performs a logout operation onto provider terminal 8. Moreover, the login state may be maintained until a predetermined period (for example, 3 days) passes from the moment of the login, and logout may be performed when the predetermined period passes.

The login state of user terminal 30 to server 200 may be maintained until the user performs a logout operation onto user terminal 30. Moreover, the login state may be maintained until a predetermined period (for example, 3 days) passes from the moment of the login, and logout may be performed when the predetermined period passes.

When communicator 224 (first receiver) receives the provision information from provider terminal 8, communicator 224 sends the provision information to provider extractor 204. On a condition that the provider ID included in the provision information exists in the provider membership DB, provider extractor 204 extracts, from the provider membership DB, a record of the provider ID included in the provision information. Provider extractor 204 stores, in the provision DB 206, the extracted provider ID, at least a part of information of the record, and the acceptance period included in the provision information, in association with one another.

It should be noted that when the provider ID included in the provision information sent to provider extractor 204 does not exist in the provider membership DB, provider extractor 204 does not perform the extraction process because the transmitted provision information is from a provider having not made the membership registration.

FIG. 6C shows an exemplary provision DB 206. In the example of FIG. 6C, the provider ID, the name of the provider, the power supply facility ID of the power supply facility provided by the provider, the location of the power supply facility of the provider, the acceptance period input from the provision reservation screen (FIG. 8), the power supply unit price, and the reservation status are stored in association with one another. In addition, other information of the provider membership DB (such as the bank account of the provider) and the like may be associated.

In the example of FIG. 6C, the record of provider A53 input in the example of FIG. 8 is stored. In the example of FIG. 6C, the provider ID, O53, is associated with the name of provider A53, the power supply facility location of the provider, the acceptance period, and the like. It should be noted that in FIG. 6C, the record of provider A62 is also stored. In the description below, in FIG. 6C, the power supply facility location and the acceptance period associated with the power supply facility location may be collectively referred to as "association information". For example, the provision information transmitted from provider terminal 8 of FIG. 7 includes the association information.

When communicator 224 (second receiver) receives the use information from user terminal 30, the use information is sent to user extractor 210. On a condition that the user ID included in the use information exists in the user membership DB, user extractor 210 extracts, from the user membership DB, a record of the user ID included in the use information. User extractor 210 stores, in the use DB 206, the extracted user ID, at least a part of information of the record, the desired location included in the use information, and the desired starting time, in association with one another.

It should be noted that when the user ID included in the use information sent to user extractor 210 does not exist in the user membership DB, user extractor 210 does not perform the extraction process because the transmitted use information is from the user having not made the membership registration.

Moreover, in the provision DB, when the present time exceeds the acceptance ending time of the acceptance period, the record of the acceptance period is deleted. Accordingly, a record no longer necessary can be prevented from remaining, with the result that the storage capacity of the provision DB can be reduced.

FIG. 6D shows an exemplary use DB 212. In the example of FIG. 6D, the user ID, the user name, the desired location input from the use reservation screen (FIG. 9), the desired starting time, and the like are associated with one another. In addition, other information of the user membership DB (such as the bank account of the user) and the like may be associated.

In the example of FIG. 6D, the record of user B21 input in the example of FIG. 9 is stored. In the example of FIG. 6C, the user ID, U21, is associated with the name of user U21, and the desired location and desired starting time for the user. It should be noted that in FIG. 6C, the record of user B24 is also stored.

As described below, when the user uses a power supply facility, server 200 performs a process for requesting, to the user, a fee corresponding to an amount of used power. When the user finishes the payment of the requested fee, the record of the user is deleted. Accordingly, a record no longer necessary can be prevented from remaining, with the result that the storage capacity of the use DB can be reduced.

Determination device 214 determines a power supply facility corresponding to the desired location and the desired starting time based on one or more pieces of stored association information. In the description below, this determination process is also referred to as "matching process". Here, the one or more pieces of stored association information are the pieces of information stored in the provision DB shown in FIG. 6C.

First, the matching process for location will be described. When the desired location for the user indicates a region, for example, when the desired location for the user indicates a region representing the whole of X City such as X City, Osaka, determination device 214 determines whether or not the power supply facility location of the provider is included in the region of the desired location. When determination device 214 determines that the power supply facility location of the provider is included in the region of the desired location, determination device 214 determines that the desired location satisfies the matching condition. On the other hand, when determination device 214 determines that the power supply facility location of the provider is not included in the region of the desired location, determination device 214 determines that the desired location does not satisfy the matching condition.

Moreover, when the desired location for the user indicates and specifies a specific address such as X City 1-1-1, Osaka, determination device 214 determines whether or not a distance L between the desired location and the power supply facility location of the provider is less than or equal to a predetermined distance threshold value Lth. When determination device 214 determines that distance L is less than or equal to threshold value distance Lth (the desired location and the power supply facility location are close to each other), determination device 214 determines that the desired location satisfies the matching condition. On the other hand, when determination device 214 determines that distance L is larger than threshold value distance Lth (the desired location and the power supply facility location are far from each other), determination device 214 determines that the desired location does not satisfy the matching condition.

Moreover, determination device 214 determines whether or not the desired starting time for the user is included in the acceptance period of the provider. When determination device 214 determines that the desired starting time for the user is included in the acceptance period of the provider, determination device 214 determines that the desired starting time satisfies the matching condition. On the other hand, when determination device 214 determines that the desired starting time for the user is not included in the acceptance period of the provider, determination device 214 determines that the desired starting time does not satisfy the matching condition.

When determination device 214 determines that the matching condition for desired location is satisfied and the matching condition for desired starting time is satisfied, determination device 214 determines, as a power supply facility to be notified to the user terminal, the power supply facility satisfying both the matching conditions. In the description below, the power supply facility to be notified to the user terminal is also referred to as "power supply facility satisfying the matching conditions".

On the other hand, when determination device 214 determines that at least one of the matching condition for desired location and the matching condition for desired starting time is not satisfied, determination device 214 determines, as a power supply facility not to be notified to the user terminal, the power supply facility used for this matching process. In the description below, the power supply facility not to be notified to the user terminal is also referred to as "power supply facility not satisfying the matching condition(s)".

Determination device 214 performs the matching process for one piece of use information based on all the pieces of the provision information stored in the provision DB.

The following describes the determination process performed by determination device 214 in the exemplary case of employing provision facility ID K53 and user B21 illustrated in FIG. 6C and FIG. 6D. The location of the power supply facility of provision facility ID K53 is X City 1-1-1, Osaka, whereas the desired location for user B21 is X City, Osaka. Here, when the desired location indicates a region such as X City, Osaka, determination device 214 determines whether or not the power supply facility location (X City 1-1-1, Osaka) is included in the desired location (X City, Osaka). X City 1-1-1, Osaka is included in X City, Osaka. Therefore, determination device 214 determines that the power supply facility location (X City 1-1-1, Osaka) is included in the desired location (X City, Osaka) and therefore determines that the matching condition for desired location is satisfied.

Moreover, the desired starting time for user B21 is 12:00 on March 19, whereas the acceptance period of provision facility ID K53 is 7:00 to 24:00 on March 19. Therefore, the desired starting time for user B21 is included in the acceptance period of provision facility ID K53. Therefore, determination device 214 determines that the matching condition for desired starting time is also satisfied.

Thus, determination device 214 determines that both the matching condition for desired location and the matching condition for desired starting time are satisfied with regard to provision facility ID K53 (power supply facility of provider A53) and user B21. Therefore, the power supply facility of provision facility ID K53 becomes the power supply facility desired for user B21 (power supply facility satisfying the matching conditions) in terms of the desired starting time and the desired location. Therefore, the power supply facility becomes the power supply facility that is to be notified to user B21.

Determination device 214 notifies, to the terminal specified from the notification target ID of the user, the location of the determined power supply facility having the power supply facility ID. In the exemplary case of power supply facility ID K53 and user B21, determination device 214 transmits, to user terminal 30 having the notification target ID of S21, the location of the power supply facility determined by determination device 214 (i.e., the power supply facility having power supply facility ID K53). Display 300 of user terminal 30 presents the location of the transmitted power supply facility.

Moreover, when there are a plurality of power supply facilities satisfying the matching conditions as a result of the matching process of determination device 214, all the locations of the plurality of power supply facilities are transmitted to user terminal 30. Display 300 of user terminal 30 presents the transmitted locations of the plurality of power supply facilities.

Figure 10:
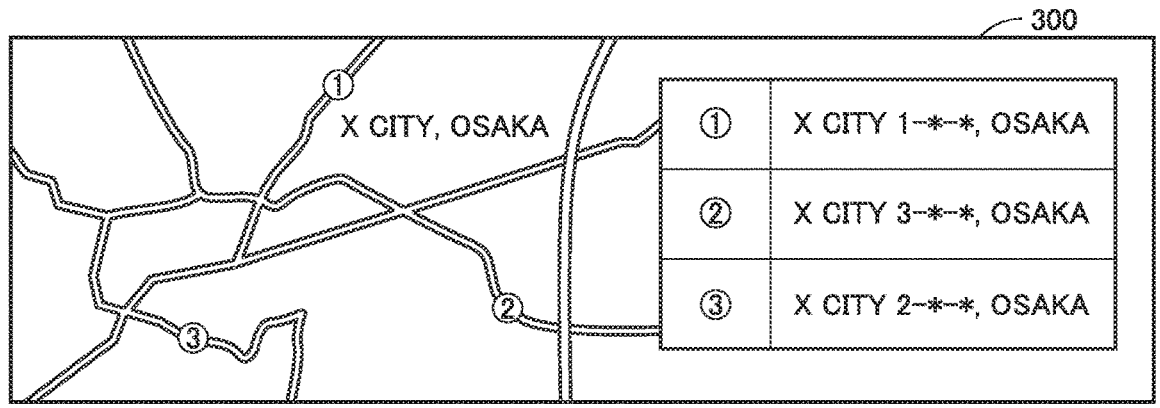
FIG. 10 shows an exemplary presentation screen of a display.

FIG. 10 shows an exemplary presentation screen of display 300. In the example of FIG. 10, a navigation screen of X City, Osaka is presented. As the locations of the power supply facilities, the locations of three power supply facilities are presented. In the example of FIG. 10, numbers 1 to 3 represent the respective power supply facilities satisfying the matching conditions. Thus, the controller (not shown) of user terminal 30 combines information indicating the locations of the power supply facilities with a navigation screen generated by a navigation screen generator (also referred to as "navigation function"; not shown in the figure particularly) of user terminal 30, thereby generating a screen such as one shown in FIG. 10. Display 300 of user terminal 30 presents the generated screen.

In a map region on the left side of FIG. 10, map information and the locations of the power supply facilities satisfying the matching conditions in this map information are presented. Moreover, in an address region on the right side of FIG. 10, a part of each of the addresses of power supply facilities 1 to 3 is presented, rather than the whole of each of the addresses of power supply facilities 1 to 3.

Here, the following describes a reason why a part of each of the addresses of power supply facilities 1 to 3 is presented rather than whole of each of the addresses of power supply facilities 1 to 3. First, a problem arising when the whole of the address of each power supply facility is presented will be described. For example, assume a case where the power supply facility and the house of the provider are located adjacent to each other. In the period during which the provider provides the power supply facility, the provider is often not in the house. In such a case, if the whole of the address is presented, the whole of the address of the house in which the provider is absent is presented, with the result that a malicious third person who knows the whole of the address by way of, for example, eavesdropping or the like may enter this house as a thief, disadvantageously.

In view of this, in the present embodiment, display 300 presents a part of the address of the power supply facility, rather than the whole of the address. Therefore, security for the provider can be improved. It should be noted that in the example of FIG. 10, the other part (part other than the foregoing part of the address) of the address is hidden by presenting *, but may be hidden by presenting other information (such as mosaic).

Moreover, when the user or the like selects (touches) the region of the number of the power supply facility in the map region and a region around the number, a determination request screen for this power supply facility is presented. Moreover, this determination request screen is also presented when the user or the like selects (touches) a portion corresponding to the power supply facility presented in the address region on the right side.

Figure 11:
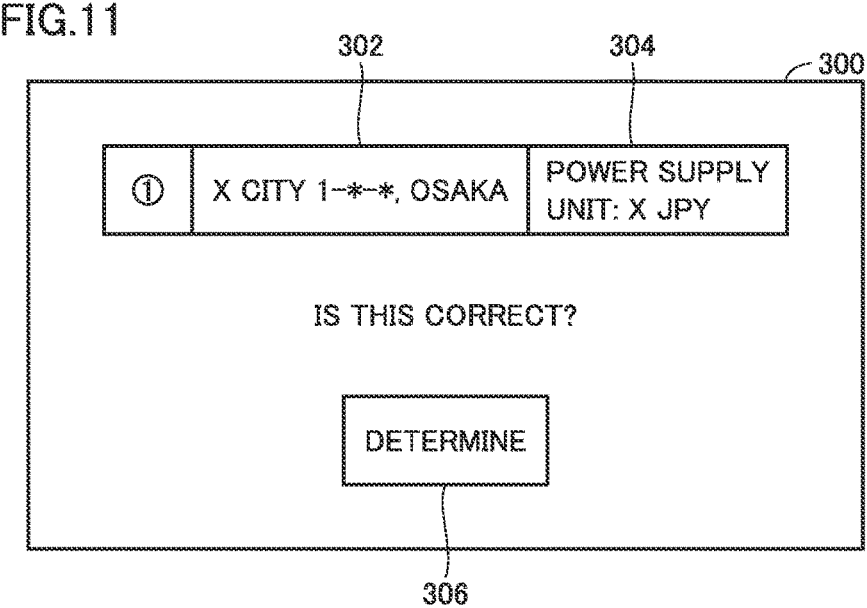
FIG. 11 shows an exemplary presentation screen of the display.

FIG. 11 shows an exemplary determination request screen. In the determination request screen, there are presented: a partial address 302 of the power supply facility selected by the user; and related information relating to the power supply facility. The related information is a power supply unit price 304. It should be noted that the related information may be other information, and may include: the area of a parking space of the power supply facility; the shape of the connector of the power supply device; and the like, for example.

In the determination request screen, a determination button 306 is also presented. When a determination operation for the power supply facility is performed by the user, i.e., when determination button 306 is touched (pressed), the power supply facility presented in the determination request screen is reserved for use. For example, in the present embodiment, user terminal 30 transmits, to server 200, reservation information (not shown) for specifying that the reservation has been made.

When server 200 receives the reservation information, server 200 reserves, for the desired starting time included in the use information from user terminal 30 having transmitted the reservation information, the power supply facility determined in the operation request screen. In the provision DB in the example of FIG. 6C, there is a record "reservation status" (see "RESERVATION STATUS" at the right end of FIG. 6C). In this reservation status, the desired starting time of user U21 indicating that the power supply facility will be started to be used from 12:00 on March 19, and U21, i.e., the ID of user U21, are stored in association with each other.

Then, server 200 transmits, to user terminal 30, reservation completion information indicating that the reservation has been completed. When the user terminal receives this reservation completion information, display 300 of user terminal 30 presents that the reservation has been completed. This presentation is to indicate "RESERVATION HAS BEEN COMPLETED", for example.

Information (for example, location) about the power supply facility for which the reservation has been completed and the like are stored in a predetermined storage region (for example, RAM) of in-vehicle device 22. This power supply facility can be classified as a candidate destination or the like, and a route from the current location to the power supply facility can be presented in response to a predetermined operation by the user. Moreover, when the vehicle has an automated driving function, the vehicle may perform automated driving to reach the power supply facility in accordance with the automated driving function.

Figure 12:
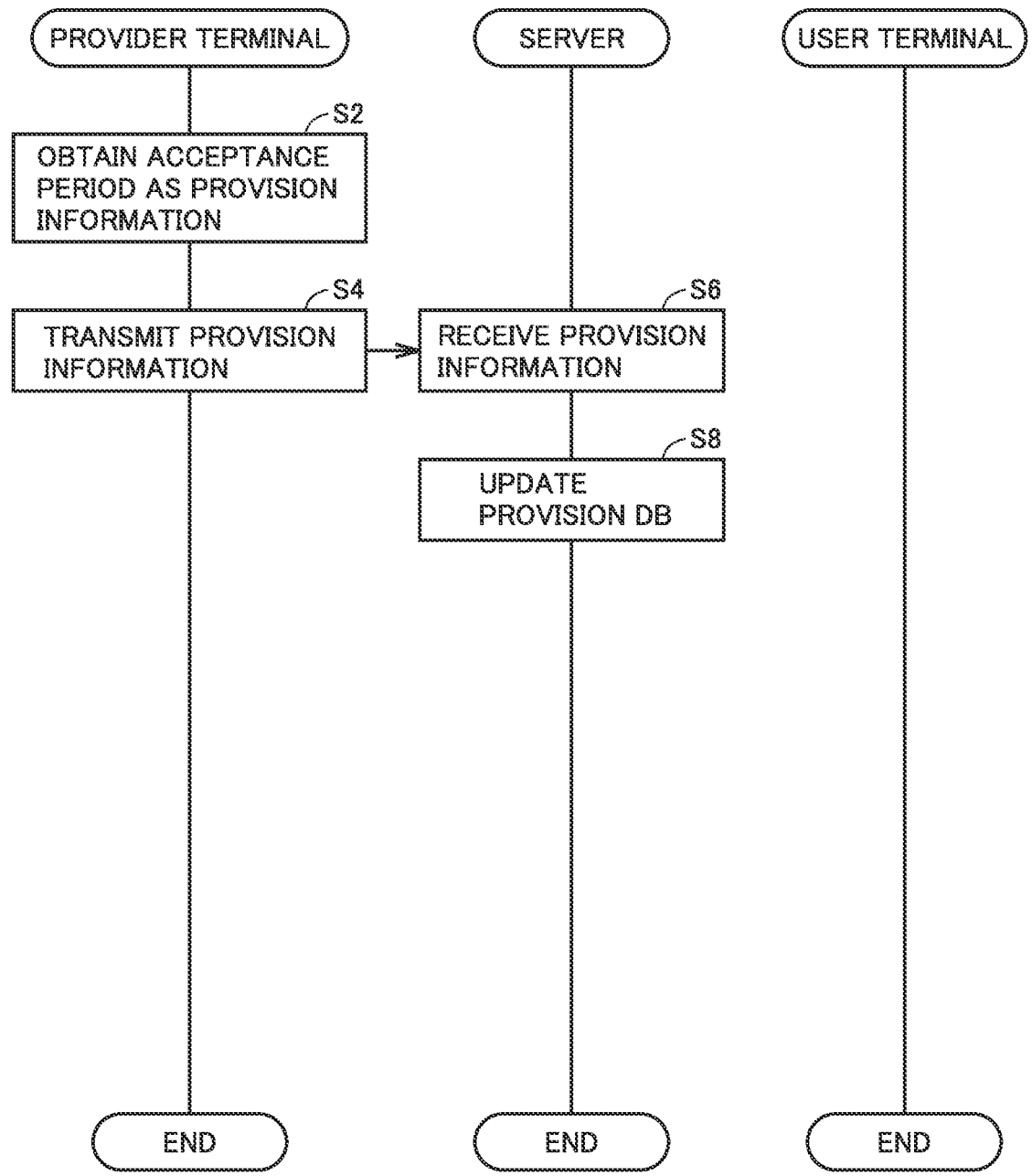
FIG. 12 is a sequence diagram showing a part of the reservation process of the present embodiment.

FIG. 12 is a sequence diagram showing a part of the reservation process in the present embodiment. In the example of FIG. 8, a process of provider terminal 8, a process of server 200, and a process of user terminal 30 are shown. It is assumed that provider terminal 8 is in the login state to server 200.

First, in S2, provider terminal 8 presents the provision reservation screen of FIG. 8. Then, provider terminal 8 receives and obtains, as the provision information, the acceptance period (acceptance starting time and acceptance ending time) of the power supply facility input from the provision reservation screen. In S4, provider terminal 8 transmits the provision information to server 200.

In S6, server 200 receives the provision information (acceptance period). In S8, server 200 updates the provision DB (see FIG. 6C) based on the provision information. For example, in FIG. 6C, when the provision information of provider A53 is not stored and the provision information of provider A53 is transmitted to server 200, server 200 performs an update to add the transmitted provision information to the provision DB.

Thus, by performing the processes of S6 and S8, server 200 updates the provision DB based on the respective pieces of provision information transmitted from one or more provider terminals 8.

Figure 13:
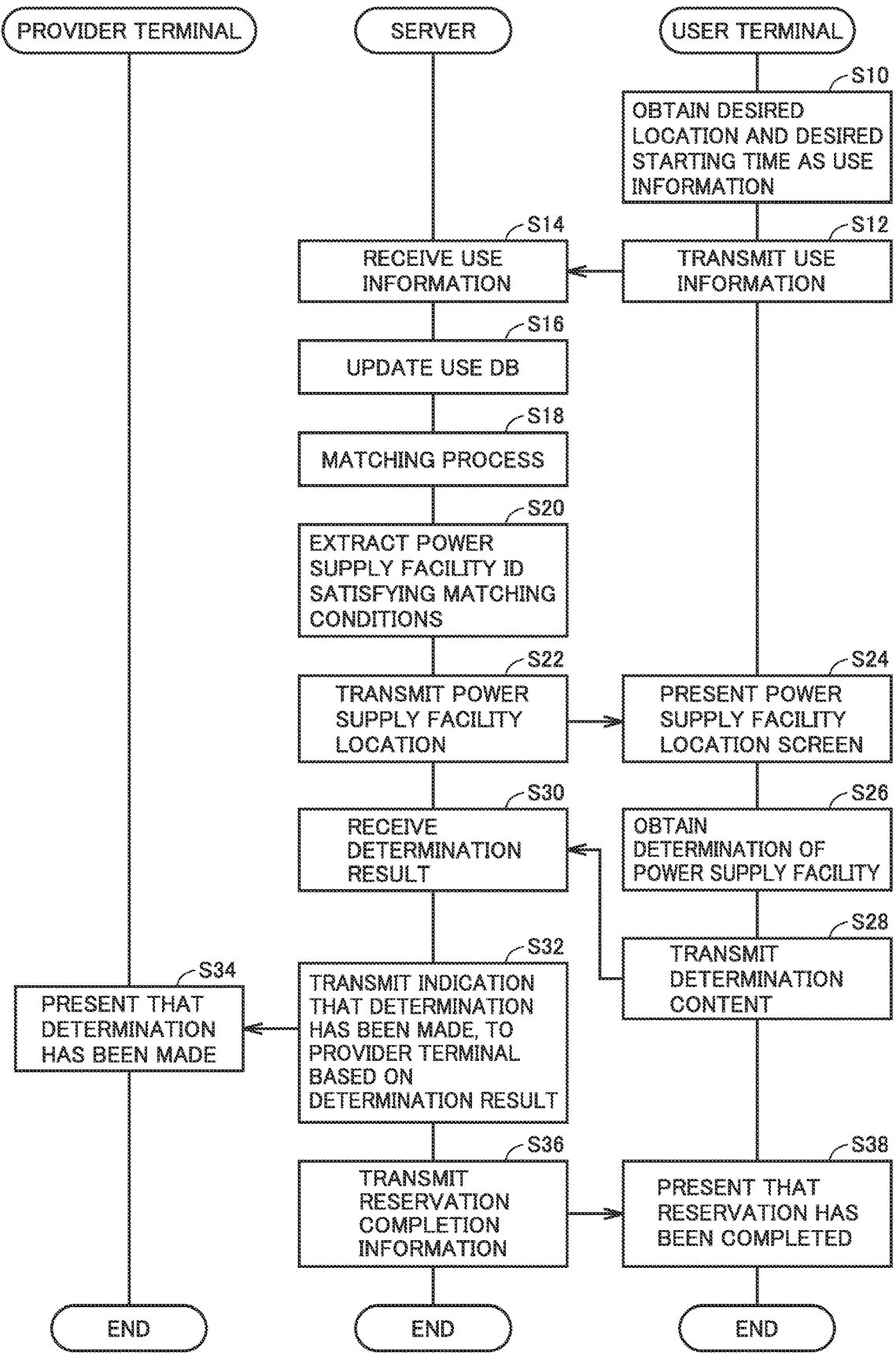
FIG. 13 is a sequence diagram showing a part of the reservation process of the present embodiment.

FIG. 13 shows a remaining part of the reservation process of the present embodiment. In S10, user terminal 30 presents the use reservation screen of FIG. 9. Then, user terminal 30 receives and obtains, as the use information, the desired location and desired starting time input from the use reservation screen. In S12, user terminal 30 transmits the use information to server 200.

In S14, server 200 receives the use information (desired location and desired starting time). In S16, server 200 updates the use DB (see FIG. 6D) based on the use information. For example, in FIG. 6D, when the use information of user B21 is not stored and the use information of user B21 is transmitted to server 200, server 200 performs an update to add the transmitted use information to the use DB.

In S18, determination device 214 performs the matching process. In S20, server 200 extracts the power supply facility ID of a power supply facility satisfying the matching conditions as a result of the matching process. When there are a plurality of power supply facilities satisfying the matching conditions in S20, server 200 extracts all the power supply facility IDs of the plurality of power supply facilities.

In S22, communicator 224 (notification device) transmits, to the user terminal specified from the notification target ID included in the use information received in S14, the locations of the one or more power supply facilities (power supply facilities satisfying the matching conditions) specified from the power supply facility location IDs.

In S24, user terminal 30 presents the locations of the power supply facilities (see FIG. 10). When there are a plurality of power supply facilities extracted by server 200 in S20 and satisfying the matching conditions, the locations of the plurality of power supply facilities are presented (see FIG. 10).

In S26, from the power supply facility presentation screen, user terminal 30 receives a determination of a power supply facility desired by the user to be used (see FIG. 11). In S28, user terminal 30 transmits the received determination content to server 200.

In S30, server 200 receives the determination content. Server 200 updates the reservation status of the provision DB based on the determination content.

In S32, server 200 transmits, to provider terminal 8 based on the determination result, determination information indicating that the reservation of the power supply facility has been determined.

In S34, based on the transmitted determination information, display 80 of provider terminal 8 presents that the reservation of the power supply facility has been determined. Through this presentation, the provider of this provider terminal 8 can recognize that the reservation of the power supply facility has been determined.

Moreover, in S36, the reservation completion information indicating that the reservation of the power supply facility has been completed is transmitted to user terminal 30 having transmitted the determination content in S28.

In S38, based on the transmitted reservation completion information, display 300 of user terminal 30 presents that the reservation of the power supply facility has been completed. Through this presentation, the user of user terminal 30 can recognized that the reservation of the power supply facility has been completed.

According to such an embodiment, the provider of the power supply facility can provide the power supply facility during the period corresponding to the acceptance period, and the user of the power supply facility can use the power supply facility at the location corresponding to the desired location and the time corresponding to the desired starting time.

Moreover, as the location of the power supply facility, server 200 notifies a part of the address of the location to the user terminal, rather than the whole of the address of the location (see FIG. 10). Therefore, security for the provider can be improved.

[Power Supply Process]

Next, the power supply process will be described. The power supply process includes a process for supplying power to the vehicle of the user for whom the reservation to use the power supply facility has been established through the reservation process.

In the present embodiment, communicator 224 of server 200 transmits, to in-vehicle device 22 (receiving device) corresponding to user terminal 30 having received the notification of the power supply facility, information (hereinafter, referred to as "permission information") for permitting supply of power to the vehicle having in-vehicle device 22 mounted thereon. "In-vehicle device 22 corresponding to user terminal 30 having received the notification of the power supply facility" is in-vehicle device 22 specified from the user ID corresponding to the notification target ID associated with user terminal 30 having received the notification of the power supply facility.

In the present embodiment, typically, the permission information is a one-time password (hereinafter, referred to as "OTP"). The permission information may be another information.

Figure 14:
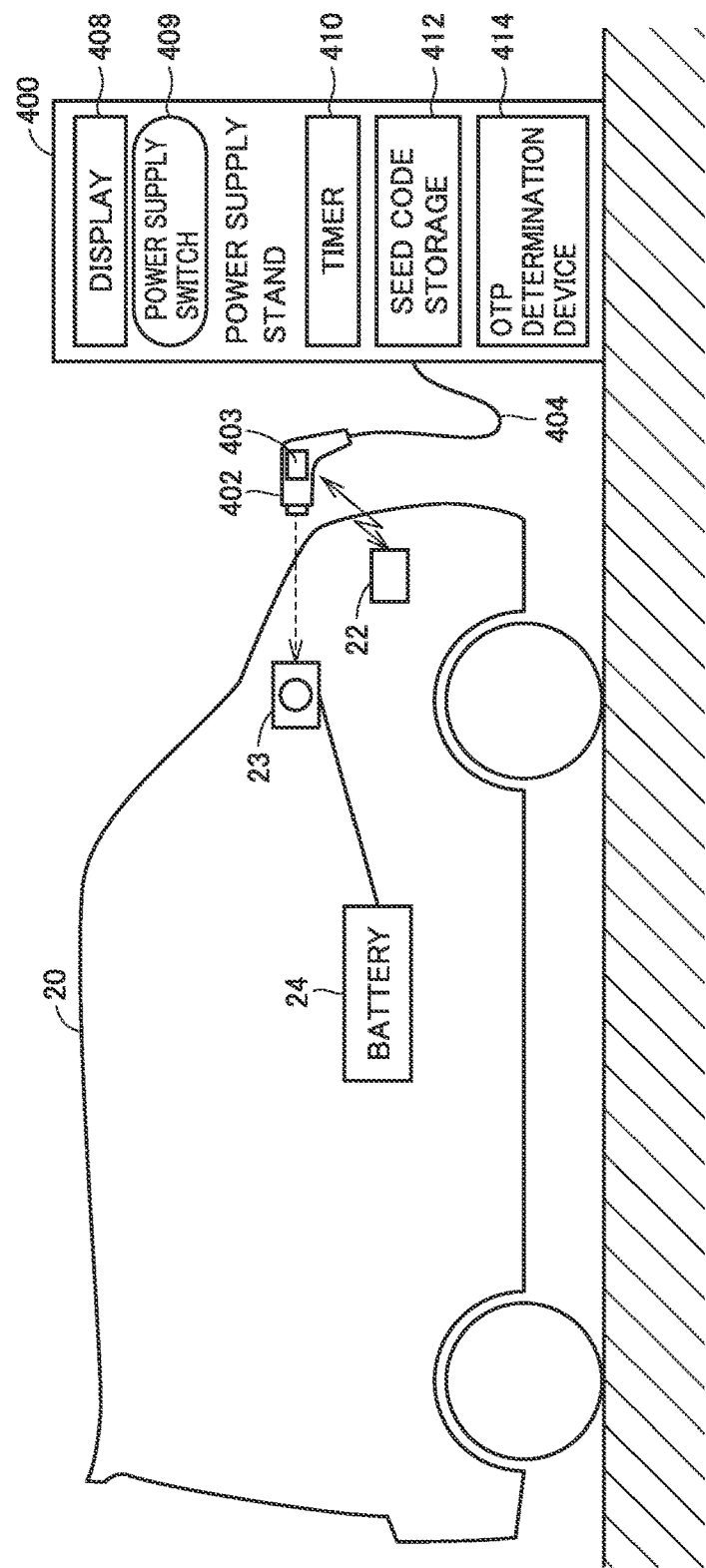
FIG. 14 shows that a vehicle having arrived at a power supply facility is supplied with power by a power supply device in the power supply facility.

FIG. 14 shows that the vehicle, which has arrived at the power supply facility, is supplied with power by power supply device 400 in the power supply facility. As shown in FIG. 14, it is assumed that vehicle 20 has in-vehicle device 22 mounted thereon.

Power supply device 400 includes: a power supply connector 402; a power supply cable 404 that connects between a power supply stand and power supply connector 402; and a display 408. Further, power supply device 400 has a timer 410, a seed code storage 412, and an OTP determination device 414. Timer 410 measures the current time. Seed code storage 412 stores a seed code associated with one power supply device 400. Moreover, the same seed code as this seed code is not given to other power supply devices, and this seed code can be specified only by server 200. OTP determination device 414 determines whether or not the OTP transmitted from in-vehicle device 22 is correct.

Vehicle 20 has an inlet 23. When power supply connector 402 is attached to inlet 23, a charger (not shown) of vehicle 20 charges a battery 24 of the vehicle using power supplied from an external power supply.

Moreover, power supply connector 402 and in-vehicle device 22 can communicate with each other. This communication is typically near field radio communication. In the description below, this communication will be referred to as "NFC communication". Power supply connector 402 includes a communication module 403 configured to make NFC communication with in-vehicle device 22.

Figure 15:
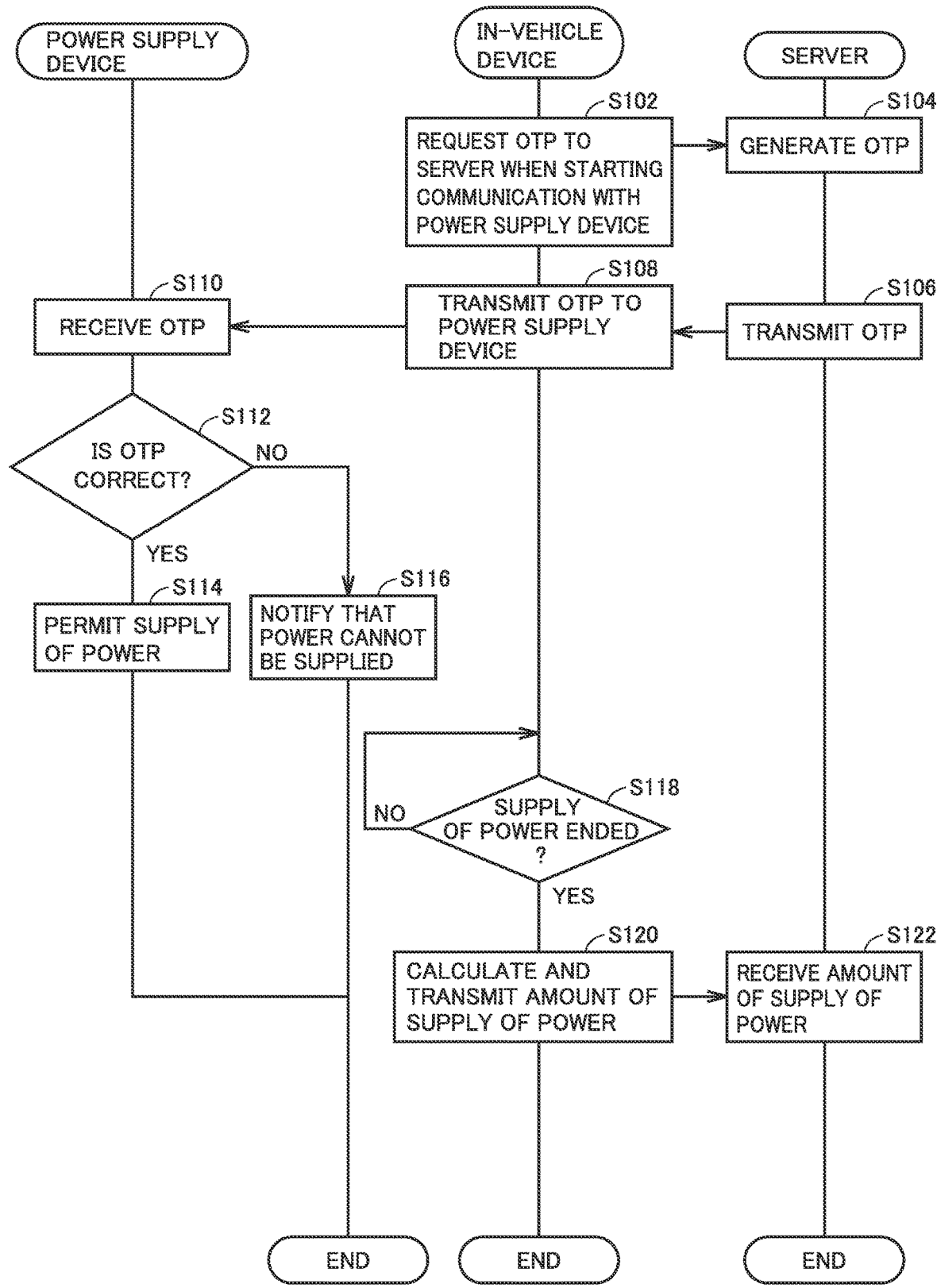
FIG. 15 is a sequence diagram showing a power supply process of the present embodiment.

FIG. 15 is a sequence diagram showing the power supply process of the present embodiment. In the example of FIG. 15, a process among in-vehicle device 22, server 200, and power supply device 400 is shown.

First, in-vehicle device 22 starts NFC communication with power supply connector 402. When this communication is started, in-vehicle device 22 transmits communication start information to power supply connector 402. When power supply connector 402 receives this communication start information, power supply connector 402 transmits, to in-vehicle device 22, recognition information indicating that the start of the communication is recognized. In S102 of FIG. 15, in-vehicle device 22 having received this recognition information transmits, to server 200, OTP request information for requesting the OTP and user ID for identifying in-vehicle device 22 or vehicle 20.

When server 200 receives the user ID and the OTP request information in S104, OTP generator 222 of server 200 generates an OTP. Here, the OTP is generated in the following manner. OTP generator 222 makes reference to the provision DB so as to extract the seed code corresponding to the provision facility reserved using the transmitted user ID. OTP generator 222 generates the OTP by substituting, for a predetermined formula a, the extracted seed code and the reception time at which the OTP request information has been received. This formula a may be any formula. Moreover, the OTP is generated using the seed code and the reception time, but the seed code is not specified from this OTP.

In S106, communicator 224 (transmitter) of server 200 transmits this OTP to in-vehicle device 22. In S108, in-vehicle device 22 transmits this transmitted OTP to power supply connector 402 through the NFC communication.

When power supply connector 402 receives this OTP in S110, OTP determination device 414 determines in S112 whether or not the received OTP is correct.

Here, the following describes an exemplary determination method. OTP determination device 414 holds the same formula a as formula a held by OTP generator 222 of server 200. OTP determination device 414 generates a confirmation OTP by substituting, for this formula a, the seed code stored in seed code storage 412 (the same seed code as that upon the generation of the OTP by server 200) and the reception time at which the OTP has been received in S110.

OTP determination device 414 compares the OTP received in S110 with the confirmation OTP. When these OTPs are the same, OTP determination device 414 determines that the OTP received in S110 is correct, whereas when these OTPs are not the same, OTP determination device 414 determines that the OTP received in S110 is not correct. It should be noted that the reception time (hereinafter, referred to as "first reception time") of the OTP request information received by server 200 does not necessarily coincide with the reception time (hereinafter, referred to as "second reception time") of the OTP received by power supply connector 402 (there is a time lag therebetween). However, a difference between the first reception time and the second reception time is a very small amount of time such as about 1 to 2 minutes. OTP determination device 414 generates the OTP so as to absorb such a very small amount of time.

When OTP determination device 414 determines that the received OTP is correct (YES in S112), the process proceeds to S114. On the other hand, when OTP determination device 414 determines that the received OTP is not correct (NO in S112), the process proceeds to S116.

In S114, the vehicle including in-vehicle device 22 having transmitted the OTP in S108 is permitted to be supplied with power. For example, notification is performed to indicate that supply of power is permitted. This notification includes a process for presenting a text on display 408 such as "POWER CAN BE SUPPLIED", for example. Moreover, this notification includes a process for outputting a sound (for example, a speech "POWER CAN BE SUPPLIED") indicating that supply of power is permitted.

On the other hand, in S116, the vehicle including in-vehicle device 22 having transmitted the OTP in S108 is notified that supply of power is not permitted. This notification includes a process for presenting a text on display 408 such as "POWER CANNOT BE SUPPLIED", for example. Moreover, this notification includes a process for outputting a sound (for example, a speech "POWER CANNOT BE SUPPLIED") indicating that supply of power is not permitted.

When a power supply switch 409 is turned on with power supply connector 402 being attached to inlet 23 after the power supply permission notification is performed, power starts to be supplied to battery 24 of vehicle 20.

Then, in-vehicle device 22 determines whether or not the supply of power is ended. For example, in-vehicle device 22 may determine that the supply of power is ended when a controller (not shown) of vehicle 20 determines that the supply of power to vehicle 20 is ended. Alternatively, in-vehicle device 22 may determine that the supply of power is completed when the user or the like performs an operation for ending the supply of power. For example, the ending operation for ending the supply of power includes a process for detaching power supply connector 402 from inlet 23. Moreover, the ending operation includes an operation for turning off power supply switch 409 provided in power supply device 400.

In S118, the process of S118 is repeated until YES is determined. When YES is determined in S118, the process proceeds to S120.

In S120, in-vehicle device 22 calculates an amount of supply of power. In the present embodiment, the amount of supply of power is based on kilowatt-hour (kWh). The amount of supply of power is calculated by subtracting the amount of power before the supply of power from the amount of power after the supply of power. Then, in-vehicle device 22 transmits the calculated amount of supply of power to server 200. In S122, server 200 receives the amount of supply of power.

According to such a configuration, the information (OTP) for permitting supply of power at the power supply facility notified by communicator 224 (notification device) of server 200 is transmitted to in-vehicle device 22 corresponding to user terminal 30 having received the notification from the notification device. Only vehicle 20 including in-vehicle device 22 having received this OTP can use the power supply facility (power supply device 400). Thus, the user having appropriately made a reservation to use the power supply device can use the power supply device. This can prevent a wrongdoing in which a user (hereinafter, referred to as "unauthorized user") who has not appropriately made a reservation to use power supply device 400 uses power supply device 400 to steal power therefrom.

Moreover, the calculation of the amount of supply of power and the transmission of this amount of supply of power to server 200 are performed by in-vehicle device 22 rather than power supply device 400. If there is employed a configuration in which the calculation of the amount of supply of power and the transmission of this amount of supply of power to server 200 are performed by power supply device 400, power supply device 400 needs to include: a module configured to calculate the amount of supply of power; and a module configured to transmit the amount of supply of power to server 200. Accordingly, the provider, who is the owner of power supply device 400, have to pay an expense for inclusion of these modules, with the result that the provider refuses to participate in the communication system of the present embodiment, disadvantageously. Since in-vehicle device 22 performs these processes in the present embodiment, occurrence of such a problem can be prevented.

Figure 16:
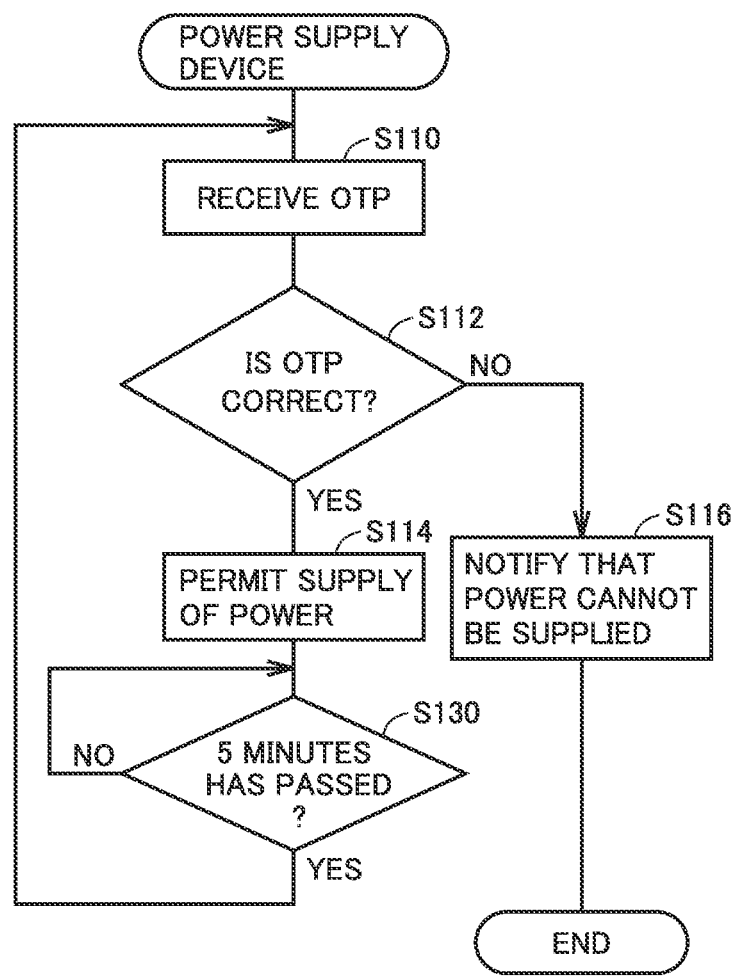
FIG. 16 is a flowchart showing a process of power supply device 400.

Moreover, there may be employed a configuration in which the determination process from S102 to S116 in FIG. 15 is repeated whenever a predetermined period (for example, 5 minutes) passes. FIG. 16 is a flowchart showing a process of power supply device 400 when such a configuration is employed.

In the example of FIG. 16, when the process of S114 is completed, the process proceeds to S130. In S130, in-vehicle device 22 determines whether or not the predetermined time (5 minutes in FIG. 16) has passed since the execution of the process of S110. In S130, power supply device 400 stands by until 5 minutes passes.

When it is determined that 5 minutes has passed in S130, the process returns to S110. In-vehicle device 22 has a timer configured to measure a time simultaneously with timer 410 of power supply device 400. In-vehicle device 22 also requests an OTP to server 200 when 5 minutes has passed since the transmission of the foregoing OTP to power supply device 400. When in-vehicle device 22 receives the requested OTP, user terminal 30 transmits this OTP to power supply device 400. S110 of FIG. 16 is a process for receiving the transmitted OTP. Moreover, since an OTP is generated every 5 minutes, it is determined whether or not an OTP, which is different each time, is correct in S112.

In many cases, a long power supply period (for example, 10 hours) is required to fully charge vehicle 20. In view of such a point, according to such a configuration, whether the OTP, which is changed whenever the predetermined period (5 minutes) passes, is correct is determined whenever the predetermined period passes. For example, in a configuration in which the confirmation of the OTP is not performed after it is once determined that the OTP is correct, an unauthorized user can steal power after it is once determined that the OTP is correct. By employing the configuration in which a different OTP is checked whenever the predetermined time passes, a wrongdoing can be securely prevented such as the stealing of power by an unauthorized user.

It has been illustrated that the permission information is the OTP, but the permission information may be another information. For example, there may be employed a configuration in which when in-vehicle device 22 does not receive the permission information, power is not supplied even though power supply connector 402 is attached to inlet 23 of vehicle 20 including in-vehicle device 22. When such a configuration is employed, in-vehicle device 22 having not received the permission information may be prohibited from being supplied with power, for example. Moreover, when such a configuration is employed, power is supplied when power supply connector 402 is attached to inlet 23 of vehicle 20 including in-vehicle device 22 having received the permission information.

[Payment Process]

Figure 17:
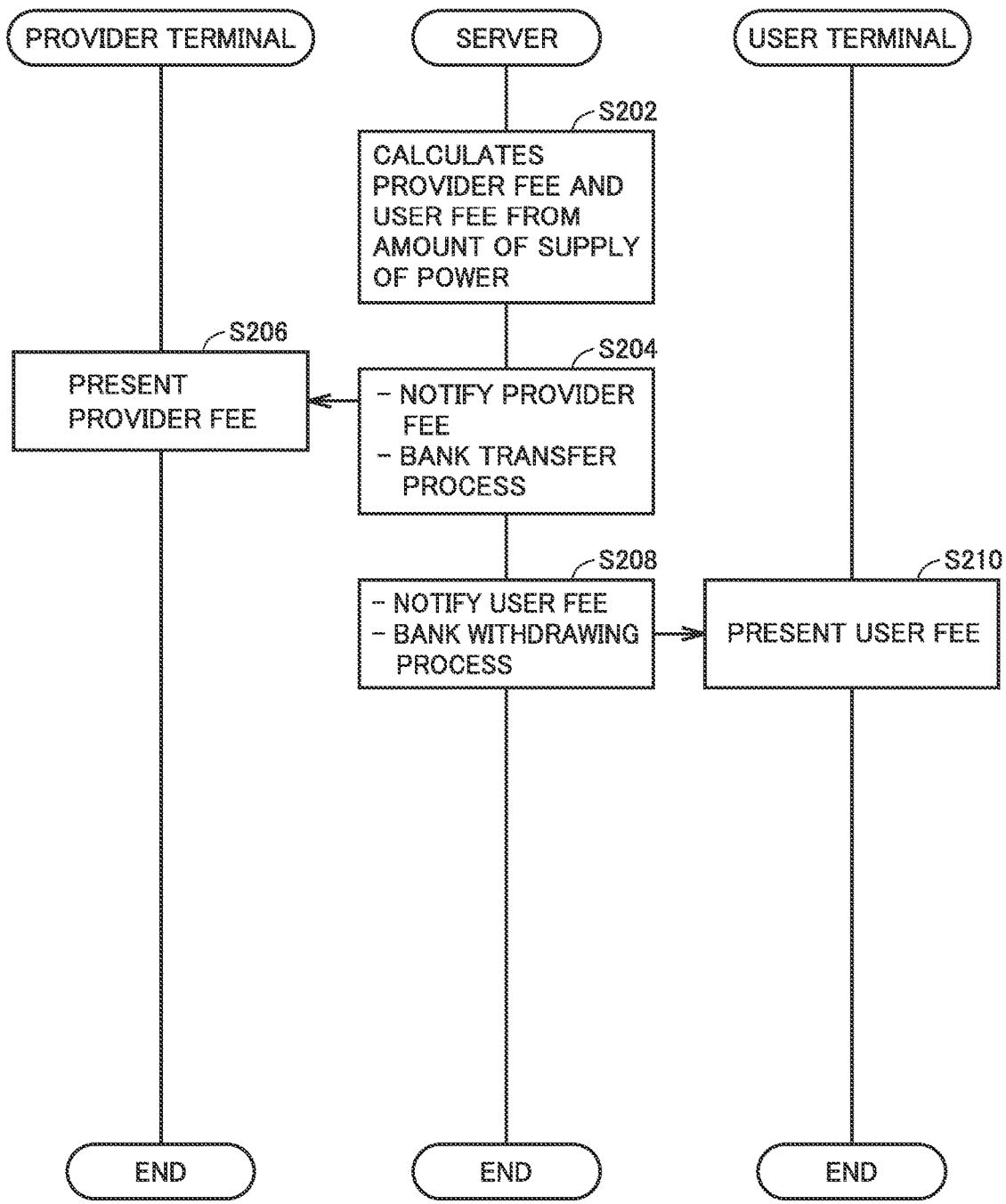
FIG. 17 is a sequence diagram showing the payment process.

Next, the payment process will be described. FIG. 17 is a sequence diagram showing the payment process. In the example of FIG. 17, a process of provider terminal 8, a process of server 200, and a process of user terminal 30 are shown.

As shown in FIG. 17, in S202, power supply amount calculator 216 of server 200 calculates: a provider fee corresponding to the amount of supply of power; and a user fee corresponding to the amount of supply of power. Here, the amount of supply of power is the amount of supply of power received by server 200 in S122 of FIG. 15. The provider fee is a fee paid to the provider in accordance with the amount of supply of power. The user fee is a fee requested to the user in accordance with the amount of supply of power.

Power supply amount calculator 216 calculates the user fee based on the amount of supply of power and the power supply unit price defined by the provider. Power supply amount calculator 216 calculates the user fee by multiplying the amount of supply of power by the power supply unit price, for example. Moreover, power supply amount calculator 216 calculates a part of the user fee as the provider fee. For example, power supply amount calculator 216 calculates the provider fee by multiplying the user fee by a predetermined coefficient X (for example, 0.8). The management company that manages communication system 1 of the present embodiment may collect a difference between the user fee (fee requested to the user) and the provider fee (fee paid to the provider).

Moreover, since the user supplies the vehicle with power in the power supply facility, the provider of this power supply facility pays, to an electric company in cooperation with the provider, an electric bill corresponding to the supply of power. In view of this, the provider preferably determines the power supply unit price (see FIG. 6A) so as to request a fee more than the amount of money paid to the electric company (amount of money obtained by multiplying the user fee by a coefficient X).

In S204, payment controller 220 performs the payment process for paying, to the provider of the power supply facility, the fee corresponding to the amount of supply of power. In the present embodiment, as shown also in S204, the payment process includes: a process for transmitting, to provider terminal 8, provider fee information indicating the provider fee; and a process for transferring the provider fee to the bank account corresponding to the provider.

In S204, communicator 224 of server 200 transmits the provider fee information to provider terminal 8. In S206, display 80 of provider terminal 8 presents the provider fee based on the provider fee information. Accordingly, the provider can recognize the fee paid to the provider.

Next, the following describes a method for specifying the provider who is a target of the payment process in S204. As shown in FIG. 6C and the like, the provision DB stores not only the power supply facility location and the acceptance period but also the provider identification information (provider ID) for identifying the provider of the power supply facility. Moreover, when a reservation of the power supply facility from a user is established, the reservation status is updated to indicate that the reservation has been made. When the power supply process for this reservation is ended, the provider having the provider ID corresponding to the reservation becomes a provider who is a target of the payment process. The expression "the power supply process is ended" means that the process of FIG. 15 is ended.

In the example of FIG. 6C, it is shown that the reservation status of provider A53 indicates that a reservation has been made by user B21. When this power supply process of user B21 is ended, provider A53 becomes a provider who is a target of the payment process.

Moreover, in S208, request controller 218 performs a request process for requesting, to the user of the power supply facility, the fee corresponding to the amount of supply of power. In the present embodiment, as shown also in S208, the request process includes: a process for transmitting, to user terminal 30, user fee information indicating the user fee; and a process for withdrawing the user fee from the bank account corresponding to the user.

Communicator 224 of server 200 transmits the user fee information to user terminal 30. In S210, display 300 of user terminal 30 presents the user fee based on the user fee information. Accordingly, the user can recognize the fee requested to the user.

Next, the following describes a method for specifying the user who is a target of the request process in S208. As shown in FIG. 6D and the like, the user ID is also included in the use information. On a condition that communicator 224 receives the user ID of the user who desires to supply power to the vehicle, communicator 224 notifies, to user terminal 30, the power supply facility determined by determination device 214. Moreover, the use DB stores not only the desired location and desired starting time but also the user identification information (user ID) for identifying the user of the power supply facility. Moreover, when a reservation of the power supply facility from the user is established, the reservation status is updated to indicate that the reservation has been made. When the power supply process for this reservation is ended, the user having the user ID corresponding to the reservation becomes a user who is a target of the request process. The expression "the power supply process is ended" means that the process of FIG. 15 is ended.

In the example of FIG. 6C, the reservation status of provider A53 indicates that the reservation has been made by user B21. When this power supply process of user B21 is ended, user B21 becomes a user who is a target of the request process.

Communication system 1 of the present embodiment can appropriately request the user, who has used the power supply facility to supply power to the vehicle, to pay the fee corresponding to the amount of supply of power. Moreover, communication system 1 of the present embodiment can appropriately pay, to the provider of the power supply facility, the fee corresponding to the amount of supply of power.

<As to Modifications>

Heretofore, the main embodiments of the present embodiment have been described, but the present embodiment is not limited to the above-described embodiments and various modifications and applications can be made. Hereinafter, modifications applicable to the present embodiment will be described.

(1) It has been illustrated that the matching conditions of the present embodiment include the following condition: "the desired starting time of the user is included in the acceptance period of the provider". For example, when the acceptance period of a certain provider is "10:00 on September 19" to "24:00 on September 19" and the desired starting time of the user is "9:30 on September 19", the matching condition for desired starting time is not satisfied in the present embodiment. However, if the provider brings the acceptance period backward by a small amount of time of 30 minutes, the matching condition will be satisfied.

In this modification, when the desired starting time of the user is not included in the acceptance period of the provider and a difference between the starting time of the acceptance period and the desired starting time is less than a predetermined value, first facilitation information is transmitted to the provider terminal to facilitate a change of the acceptance period. Here, the predetermined value is a time determined in advance, and is typically a small amount of time. It is assumed that the predetermined value is 1 hour, for example. Moreover, an administrator or the like of server 200 can adjust this predetermined value.

In the example of FIG. 7, a first facilitator 226 generates the first facilitation information. Moreover, in FIG. 13, when the desired starting time of the user is not included in the acceptance period of the provider and a difference X between the starting time of the acceptance period and the desired starting time is less than the predetermined value in the matching process in S18, first facilitator 226 generates the first facilitation information. The first facilitation information is typically information for facilitating to bring the starting time of the acceptance period backward by difference X (30 minutes in this example).

When first facilitator 226 generates the first facilitation information, first facilitator 226 transmits the first facilitation information to provider terminal 8 via communicator 224. Provider terminal 8 presents a first facilitation screen on display 80 based on the first facilitation information.

Figure 18:
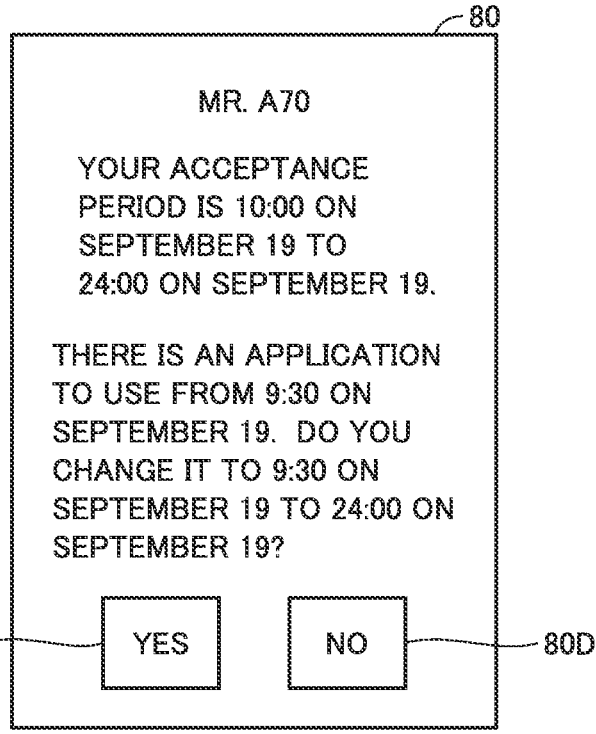
FIG. 18 shows an exemplary first facilitation screen.

FIG. 18 shows an exemplary first facilitation screen. In the first facilitation screen of FIG. 18, the following items are presented: the name of the provider, A70; a text such as "YOUR ACCEPTANCE PERIOD IS 10:00 ON SEPTEMBER 19 TO 24:00 ON SEPTEMBER 19. THERE IS AN APPLICATION TO USE FROM 9:30 ON SEPTEMBER 19. DO YOU CHANGE IT TO 9:30 ON SEPTEMBER 19 TO 24:00 ON SEPTEMBER 19?"; a YES button 80C; and a NO button 80D. This text facilitates the provider to bring the starting time of the acceptance period backward by difference X (30 minutes in the above-described example).

When YES button 80C is operated by the provider or the like, the acceptance period is changed. Server 200 changes the starting time of the target acceptance period among the records of the provision DB, for example. Accordingly, the power supply facility not having satisfied the matching condition satisfies the matching condition, and the location of this power supply facility is transmitted to user terminal 30. On the other hand, when NO button 80D is operated by the provider or the like, the acceptance period is not changed.

According to such a configuration, the provider of the power supply facility not having satisfied the matching condition is facilitated to satisfy the matching condition (bring the acceptance starting time backward). This increases an opportunity for the provider to provide the power supply facility as well as an opportunity for the user to use the power supply facility.

(2) It has been illustrated that the matching conditions of the present embodiment include the following condition: "the desired starting time of the user is included in the acceptance period of the provider". For example, when the acceptance period of a certain provider is "10:00 on September 19" to "24:00 on September 19" and the desired starting time of the user is "9:30 on September 19", the matching condition for desired starting time is not satisfied in the present embodiment. However, if the user brings the desired starting time forward by a small amount of time of 30 minutes, the matching condition will be satisfied.

In this modification, when the desired starting time of the user is not included in the acceptance period of the provider and a difference between the starting time of the acceptance period and the desired starting time is less than a predetermined value, second facilitation information is transmitted to the user terminal to facilitate a change of the desired starting time. Here, the predetermined value is a time determined in advance, and is typically a small amount of time. For example, it is assumed that the predetermined value is 1 hour. Moreover, an administrator or the like of server 200 can adjust this predetermined value.

In the example of FIG. 6A to FIG. 6D, a second facilitator 228 generates the second facilitation information. Moreover, in FIG. 13, when the desired starting time of the user is not included in the acceptance period of the provider and a difference X between the starting time of the acceptance period and the desired starting time is less than the predetermined value in the matching process in S18, second facilitator 228 generates the second facilitation information. The second facilitation information is typically information for facilitating to bring the starting time of the desired starting time forward by difference X (30 minutes in this example).

When second facilitator 228 generates the second facilitation information, second facilitator 226 transmits the second facilitation information to user terminal 30 via communicator 224. User terminal 30 presents a second facilitation screen on display 300 based on the second facilitation information.

Figure 19:
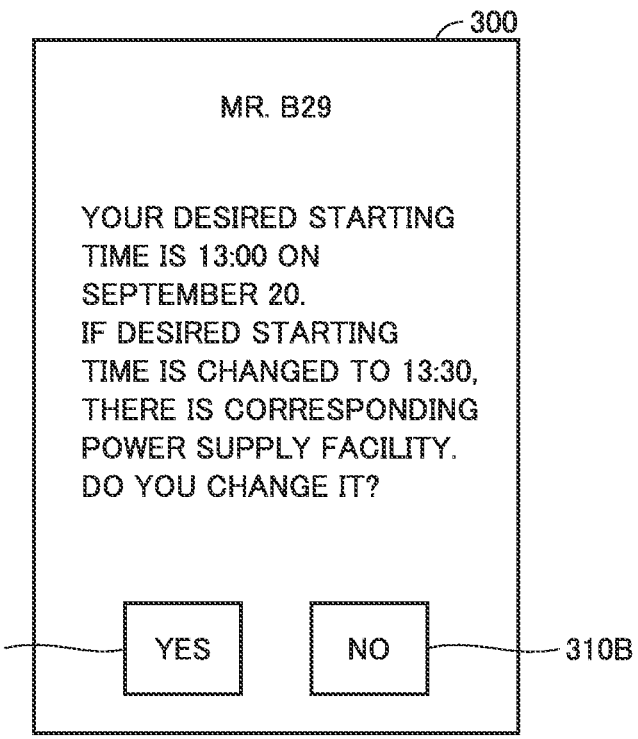
FIG. 19 shows an exemplary second facilitation screen.

FIG. 19 shows an exemplary second facilitation screen. In the second facilitation screen of FIG. 19, the following items are presented: the name of the user, B29; a text such as "YOUR DESIRED STARTING TIME IS 13:00 ON SEPTEMBER 20. IF DESIRED STARTING TIME IS CHANGED TO 13:30, THERE IS CORRESPONDING POWER SUPPLY FACILITY. DO YOU CHANGE IT?"; a YES button 310A; and a NO button 310B. This text facilitates the user to bring the starting time of the acceptance period forward by difference X (30 minutes in the above-described example).

When YES button 310A is operated by the user or the like, the acceptance period is changed. Server 200 changes the target desired starting time among the records of the use DB, for example. Accordingly, the power supply facility not having satisfied the matching condition satisfies the matching condition, and the location of this power supply facility is transmitted to user terminal 30. On the other hand, when NO button 310B is operated by the user or the like, the acceptance period is not changed.

According to such a configuration, for the power supply facility not having satisfied the matching condition, the user is facilitated to satisfy the matching condition (bring the acceptance starting time forward). This increases an opportunity for the provider to provide the power supply facility as well as an opportunity for the user to use the power supply facility.

(3) In the example of FIG. 6C, the provider ID and the power supply unit price are associated with each other in the provision DB. When there are a plurality of power supply facilities satisfying the matching conditions in the matching process performed by determination device 214, the respective locations of the plurality of power supply facilities are notified to user terminal 30. When the plurality of power supply facilities are presented on user terminal 30, the user tends to select a power supply facility with the lowest power supply unit price among the plurality of power supply facilities.

In view of this tendency, when there are a plurality of power supply facilities satisfying the matching conditions, third facilitation information for facilitating reduction of the power supply fee is transmitted to the provider terminal corresponding to the most expensive power supply fee among the power supply fees of the plurality of power supply facilities.

For example, the following case will be described: there are three power supply facilities satisfying the matching conditions and the power supply unit prices of these three power supply facilities are 25 JPY/kWh, 27 JPY/kWh, and 30 JPY/kWh, respectively. In this case, since the power supply fee of the power supply facility with 30 JPY/kWh is the most expensive, server 200 transmits, to the provider terminal of the provider of this power supply facility with 30 JPY/kWh, the third facilitation information for facilitating reduction of the power supply fee.

Figure 20A:
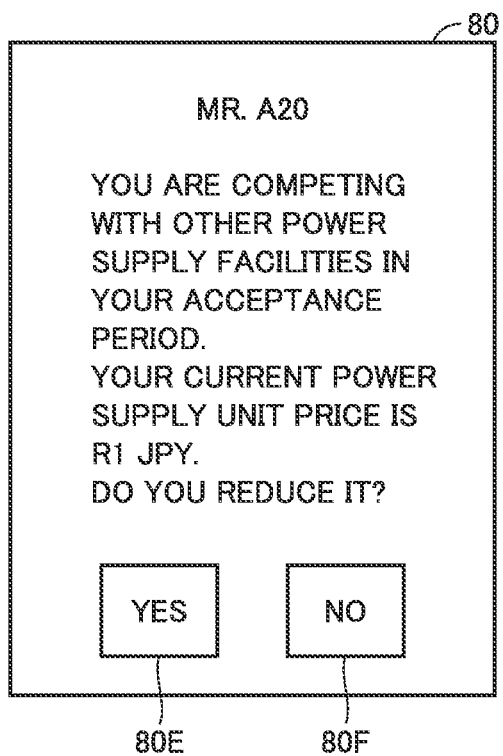
FIG. 20A and FIG. 20B show an exemplary third facilitation screen.
Figure 20B:
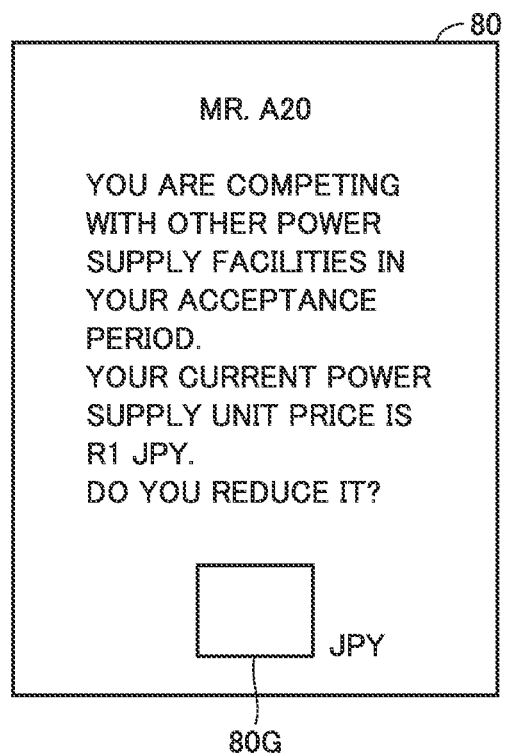

Provider terminal 8 presents a third facilitation screen on display 80 based on the third facilitation information. FIG. 20A and FIG. 20B show an exemplary third facilitation screen. In the example of FIG. 20A, provider A20 is notified of the following facts: "there are a plurality of power supply facilities satisfying the matching conditions and including the power supply facility provided by this provider"; and "the power supply unit price of the power supply facility of provider A20 is the most expensive among the plurality of power supply facilities".

In FIG. 20A, the following text is presented: "YOU ARE COMPETING WITH OTHER POWER SUPPLY FACILITIES IN YOUR ACCEPTANCE PERIOD. YOUR CURRENT POWER SUPPLY UNIT PRICE IS R1 JPY. DO YOU REDUCE IT?". Further, in the screen of FIG. 20A, a YES button 80E and a NO button 80F are presented.

When YES button 80E is operated by the provider or the like, switching is made to a screen of FIG. 20B. In the example of FIG. 20B, an input space 80G (input space) for receiving input of a power supply unit price is presented. When the provider inputs a power supply unit price to input space 80G, the power supply unit price thus input is transmitted from the provider terminal to server 200.

When server 200 receives the power supply unit price, the power supply unit price stored in the provision DB is changed to the received power supply unit price. Moreover, the changed power supply unit price is transmitted to the user terminal. By changing the power supply unit price, the power supply unit price of the power supply facility is changed.

According to such a configuration, an opportunity for the provider to provide the power supply facility can be increased and the user can use the power supply facility inexpensively.

Moreover, when there are a plurality of power supply facilities satisfying the matching conditions, the third facilitation information may be transmitted to respective provider terminals 8 of the providers of the power supply facilities with up to the L-th most expensive power supply unit prices (L is an integer more than or equal to 2) among the plurality of power supply facilities.

(4) Next, the following describes a modification of the matching condition for desired starting time. In the above-described embodiment, it has been illustrated that when determination device 214 determines that the desired starting time is included in the acceptance period, determination device 214 determines that the matching condition for desired starting time is satisfied.

However, in many cases, a long power supply period (for example, 10 hours) is required to fully charge a vehicle. Then, in view of the case where the long power supply period is required to fully charge the vehicle, a condition in which a period from the desired starting time to the acceptance ending time of the acceptance period is longer than or equal to a predetermined period may be also included in the matching condition for desired starting time. The predetermined period is a period (for example, 10 hours) required to fully charge the vehicle with power, and is a period determined in advance.

That is, in the present modification, determination device 214 determines that the matching condition for desired starting time is satisfied when the desired starting time is a time after the acceptance starting time of the acceptance period and a period from the desired starting time to the acceptance ending time of the acceptance period is longer than or equal to the predetermined period. According to such a configuration, the matching process is performed also in consideration of the time required to supply power to the vehicle, whereby a more precise matching process can be performed.

(5) Next, the following describes a modification of the use DB. In the present embodiment, it has been illustrated that when the user completes the payment of the requested fee, the record of the user is deleted. However, the record of the user may not be deleted when the user completes the payment of the requested fee. For example, in FIG. 6D, information "REQUEST" is also included, information "NOT PAID" is stored with regard to a user who does not complete payment of a requested fee, and information "PAID" is stored with regard to a user who completes payment of a requested fee.

According to such a configuration, since the record of the user who completes the payment of the requested fee remains, server 200 can specify how frequent the user uses communication system 1. As a result, this can be utilized for various types of marketing, for example, a user who highly frequently uses communication system 1 can be notified of an advertisement for providing another service. Moreover, a user who less frequently uses communication system 1 can be notified of an advertisement for facilitating the user to use this communication system 1 more frequently. This can increase an opportunity for the user, who less frequently uses communication system 1, to use communication system 1.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A communication system comprising:
a server;
a first terminal configured to communicate with the server; and
a second terminal configured to communicate with the server,
the first terminal including a first transmitter configured to transmit, to the server, (i) location information for specifying a location of a power supply facility for supplying power to a vehicle and (ii) an acceptance period for accepting the supply of power at the location,
the second terminal including a second transmitter configured to transmit, to the server, information including (i) a desired location for the supply of power to the vehicle and (ii) a desired starting time for the supply of power to the vehicle at the desired location,
the server including
a storage configured to store one or more pieces of association information in which respective pieces of location information are associated with respective acceptance periods,
a determination device configured to determine a power supply facility corresponding to the desired location and the desired starting time based on the one or more pieces of stored association information, and
a notification device configured to notify a location of the power supply facility determined by the determination device, wherein
as the association information, the storage is configured to store the location information, the acceptance period, and a power supply fee in association with one another, and
when the notification device notifies locations of a plurality of power supply facilities, the server is configured to transmit, to the first terminal corresponding to an expensive power supply fee of respective power supply fees of the plurality of power supply facilities, facilitation information for facilitating reduction of the power supply fee.

2. The communication system according to claim 1, wherein the server further includes a third transmitter configured to transmit, to an in-vehicle device that receives the notification from the notification device, information for permitting the supply of power at the power supply facility notified by the notification device.

3. The communication system according to claim 2, wherein the in-vehicle device is configured to request the server whenever a predetermined period passes, to transmit the information for permitting the supply of power at the power supply facility notified by the notification device.

4. The communication system according to claim 1, wherein when the desired starting time is not included in the acceptance period and a difference between a starting time of the acceptance period and the desired starting time is less than a predetermined value, the server is configured to transmit, to the first terminal, first facilitation information for facilitating a change of the acceptance period.

5. The communication system according to claim 1, wherein when the desired starting time is not included in the acceptance period and a difference between a starting time of the acceptance period and the desired starting time is less than a predetermined value, the server is configured to transmit, to the second terminal, second facilitation information for facilitating a change of the desired starting time.

6. The communication system according to claim 1, wherein as the location of the power supply facility, the notification device is configured to notify a part of an address of the location, rather than a whole of the address of the location.

7. The communication system according to claim 1, wherein
on a condition that the server receives user identification information of a user who desires to supply power to the vehicle, the notification device is configured to notify, to a terminal of the user, the power supply facility determined by the determination device, and
the server further includes a request controller configured to perform a process for requesting, to the user for whom the supply of power to the vehicle has been ended and who corresponds to the user identification information, a fee corresponding to an amount of the supply of power.

8. The communication system according to claim 7, wherein the amount of the supply of power is calculated by an in-vehicle device of the vehicle.

9. The communication system according to claim 1, wherein
in addition to the location information and the acceptance period, the storage is configured to store provider identification information for identifying a provider of the power supply facility, and
the server further includes a payment controller configured to perform a process for paying, to the provider having provided the power supply facility and corresponding to the provider identification information, a fee corresponding to an amount of the supply of power, when the supply of power to the vehicle at the power supply facility is ended.

10. The communication system according to claim 9, wherein the amount of the supply of power is calculated by an in-vehicle device of the vehicle.

11. The communication system according to claim 1, wherein the determination device is configured to determine, as a power supply facility corresponding to the desired starting time, a power supply facility satisfying a condition that the desired starting time is a time after the acceptance starting time of the acceptance period and a period from the desired starting time to the acceptance ending time of the acceptance period is longer than or equal to a predetermined period.

12. A server configured to communicate with a terminal, the terminal configured to transmit, to the server, (i) location information for specifying a location of a power supply facility for supplying power to a vehicle and (ii) an acceptance period for accepting the supply of power at the location, the server comprising:
a first receiver configured to receive the location information and the acceptance period
a second receiver configured to receive information including (i) a desired location for the supply of power to the vehicle and (ii) a desired starting time for the supply of power to the vehicle at the desired location;
a storage configured to store one or more pieces of association information in which respective pieces of location information are associated with respective acceptance periods;
a determination device configured to determine a power supply facility corresponding to the desired location and the desired starting time based on the one or more pieces of stored association information; and
a notification device configured to notify a location of the power supply facility determined by the determination device, wherein
as the association information, the storage is configured to store the location information, the acceptance period, and a power supply fee in association with one another, and
when the notification device notifies locations of a plurality of power supply facilities, the notification device is configured to transmit, to the terminal corresponding to an expensive power supply fee of respective power supply fees of the plurality of power supply facilities, facilitation information for facilitating reduction of the power supply fee.

13. A terminal configured to communicate with a server configured to store one or more pieces of association information in which respective pieces of location information for specifying locations of power supply facilities each for supplying power to a vehicle are associated with respective acceptance periods for accepting the supply of power at the locations, the terminal comprising:
a transmitter configured to transmit, to the server, information including (i) a desired location for the supply of power to the vehicle and (ii) a desired starting time for the supply of power to the vehicle at the desired location; and
a receiver configured to receive information of a location of a power supply facility determined based on the one or more pieces of stored association information, the power supply facility corresponding to the desired location and the desired starting time, wherein
as the association information, the server is configured to store the location information, the acceptance period, and a power supply fee in association with one another, and
when the server notifies locations of a plurality of power supply facilities, the server is configured to transmit, to the terminal corresponding to an expensive power supply fee of respective power supply fees of the plurality of power supply facilities, facilitation information for facilitating reduction of the power supply fee.

* * * * *